United States Patent
Zievers

(10) Patent No.: US 7,120,706 B2
(45) Date of Patent: *Oct. 10, 2006

(54) CONTENTION RESOLUTION IN A MEMORY MANAGEMENT SYSTEM

(75) Inventor: Peter J. Zievers, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 410 days.

This patent is subject to a terminal disclaimer.

(21) Appl. No.: 10/699,530

(22) Filed: Oct. 31, 2003

(65) Prior Publication Data

US 2005/0108464 A1    May 19, 2005

(51) Int. Cl.
    *G06F 13/00* (2006.01)
(52) U.S. Cl. .................. 710/6; 710/107; 711/100; 711/150; 711/168
(58) Field of Classification Search ........ 711/100–106, 711/147–157, 128, 167, 168; 710/107–114, 710/5–7; 365/230, 189, 222
See application file for complete search history.

(56) References Cited

U.S. PATENT DOCUMENTS

| | | | | |
|---|---|---|---|---|
| 4,044,333 A | * | 8/1977 | Auspurg et al. | 710/316 |
| 6,026,464 A | * | 2/2000 | Cohen | 711/5 |
| 6,115,768 A | * | 9/2000 | Yamamoto | 710/107 |
| 6,470,428 B1 | * | 10/2002 | Milway et al. | 711/138 |
| 2002/0029106 A1 | * | 3/2002 | Shimotani et al. | 701/200 |
| 2005/0132159 A1 | * | 6/2005 | Jeddeloh | 711/167 |

* cited by examiner

*Primary Examiner*—Christopher Shin

(57) ABSTRACT

A memory management system for resolving contention for access to a plurality of memories. Signals are continuously applied to an access flow regulator indicating the busy/idle state of each memory. The access flow regulator uses the received signals to determine the present busy/idle state of each of the memories. Requests are applied to the access flow regulator for read and write access to the memories. The access flow regulator operates in response to a determination that one of the memories is currently idle for granting a request access to a memory as soon as it switches from a busy to and idle state.

20 Claims, 14 Drawing Sheets

CONTENTION RESOLUTION IN A MEMORY MANAGEMENT SYSTEM

RELATED APPLICATIONS

This application is related to the following concurrently filed applications by the same inventor:
1. Application Ser. No. 10/699,315
2. Application Ser. No. 10/699,355

FIELD OF THE INVENTION

This invention relates to memory management facilities for a communication network and in particular to facilities that optimize traffic serving capabilities of the network by reducing blocking at the network nodes. This invention further relates to memory management facilities that improve traffic flow by reducing contention time for access to network memory elements. This invention further relates to an arrangement for reducing processing and contention time by distributing the storage of information between small storage capacity, high speed memories and a lower speed high storage capacity bulk memory.

PROBLEM

It is known to actively manage multi-node communication networks to improve the network traffic serving capabilities. Networks are designed with sufficient facilities at each node to adequately serve the anticipated traffic. This includes the provision of facilities required to serve the normal amount of traffic as well as additional facilities to serve infrequently occurring peak traffic to the extent it is economically feasible. Communication networks are not normally designed to provide the amount of facilities that would be required to serve traffic peaks that might theoretically be possible but rarely, if ever, are encountered.

Multi-node communication networks may encounter traffic blocking even though the network as a whole is engineered to serve an adequate level of traffic. This blocking is due to an unequal distribution of the traffic wherein some, but not all, of the network nodes are overloaded with an inordinate level of traffic. A network node can be overloaded if it is the destination node to which the network connection requests are directed. A network node can also be overloaded if it is connected via a link to the requested destination node and receives requests from upstream nodes directed to the destination node. It is known to equip networks with traffic shaping facilities to minimize the overload of nodes due to unequal traffic distribution. These traffic shaping nodes monitor the traffic at each node as well as the connection requests generated by each node. Congestion at a distant node is prevented by throttling the number of requests a sending node may generate for access to a distant node that is already overloaded.

Multi-node networks and their traffic shaping facilities enable networks to serve normal traffic levels at a satisfactory low level of blocking. However, the facilities required to manage and control the network traffic are complex, expensive and they reduce the traffic throughput of the network due to the complexity of the processing operations required. These facilities include the provisions of processor controlled linked list engines at the input and output of the nodes to buffer incoming and outgoing traffic. The operation of the linked list engine entails complex data processing operations required for the minimization of contention problems within the linked list engines. The complexities of these contention problems reduce the traffic serving capabilities of the entire network.

An overload can be caused by the exhaustion of the linked list buffers at each node when periods of heavy traffic are encountered. This can cause packets to be dropped so that the performance of the system becomes seriously degraded. Buffer overload is caused by an inadequate buffer size or by the use of the buffers of insufficient speed to handle the incoming traffic. Systems designers have been faced with the alternatives of using buffers that were slow and big, or are fast but of small capacity. Buffers that are slow and big hinder the flow of network traffic by causing packets to be lost. Buffers that are fast and of small capacity also cause the buffers to be overloaded and packets to be dropped due to lack of available buffers during heavy bursting.

An underlying problem associated with both types of buffers is due to contention problems occurring when multiple accesses are encountered for use of the same facility. This occurs, for example, when multiple accesses are received for access to write or read a particular memory bank. Under such circumstances, one access wins while the other access waits for the availability of the requested memory bank. Calls associated with the winning access are adequately served; those associated with delayed accesses are either dropped or inadequately served.

Contention for access to RAM memory banks is due to either the use of an inadequate number of RAM memory banks and/or due to the contention facilities provided to serve the memory banks. Some contention facilities rely upon algorithms and processes that limit the rate at which accesses can be served. One such prior art arrangement utilizes an algorithm which requires a minimum time delay of approximately 250 nanoseconds between accesses. This is a significant limitation since it makes no provisions for determining whether or not a second RAM memory bank is available to receive an access following the assignment of an access to a first memory bank. Thus, with a time interval of 250 nanoseconds between the serving of accesses, system throughput is limited to the serving of a maximum of 4,000,000 accesses per second with no regard being given to the availability of RAM memory banks. Another problem associated with the existing contention arrangements is that many of them utilize logic facilities that are complex, expensive, and inadequate to serve high traffic levels.

SOLUTION

The present invention overcomes these contention problems in accordance with a first possible exemplary embodiment which provides an increased number of RAM memory banks. This in itself reduces the possibility of contention. A second feature provided by the present invention is to provide each RAM memory bank with an associated control element termed a state controller. The state controller is an interface between its RAM memory bank and the system bus over which the access requests are received. All access requests are applied to the system bus by an access flow regulator which receives all access requests generated by a node, determines whether a RAM memory bank available to serve the access requests, buffers the access request if the specified RAM memory bank is currently busy, and applies the access request to the state controller associated with the RAM memory bank when idle. If the RAM memory bank is busy, the state controller applies a signal to the access flow regulator indicating that its RAM memory bank is currently busy serving another access and is unavailable to serve further access requests for the time being.

In the case of a write access request, an access flow regulator scans all state controllers when attempting to route the access request to the RAM memory banks. In so doing, it immediately bypasses state controllers currently generating a busy signal for their associated RAM memory bank or RAM memory banks having no available space for storage. The access flow regulator bypasses the busy or the fully consumed RAM memory banks and their state controllers and directs the access request to idle RAM memory banks that do have available buffers for storage space.

The memories of the RAM memory bank are of the type having a high speed but relatively low storage capacity. Each RAM memory bank can quickly process each access request directed to it. At the completion of its access cycle, its state controller removes the busy signal to an access flow regulator indicating the state of its RAM. Immediately upon the removal of the busy signal, the access flow regulator knows that the RAM memory bank is now available to serve new access requests.

Another feature of the invention is the use operation of a RAM memory bank busy signal that persists only for the brief time interval that the RAM memory bank is busy. The provision of this signal constitutes a contention arrangement that is advantageous and capable of serving access requests at a rate that is limited only by the speed of the RAM devices embodying the RAM memory bank. This contention arrangement is a significant improvement over the prior art arrangements for which the rate that accesses can be served is limited by the imposition of mandatory time intervals or limited by the complexity of the contention logic provided.

By the use of the contention facilities embodying the present invention, the maximum rate at which the dynamic RAM memory bank facility can operate is limited only by the speed of the RAM devices utilized other than by arbitrary limitations inherent in the contention arrangements. The dynamic high speed RAM memory bank facilities embodying the present invention can be operated in a pipe lined manner to serve packets arriving at the bus rate of optical fiber transmission facilities. The contention arrangement provided by the present invention increases the rate at which the processor controlled linked lists engines can serve incoming and outgoing traffic with minimum congestion during the serving of high traffic levels.

DESCRIPTION OF THE DRAWINGS

These and other aspects of the invention may be better understood from a reading of the detailed description taken in conjunction with the drawings in which.

DETAILED DESCRIPTION

Figure 1:
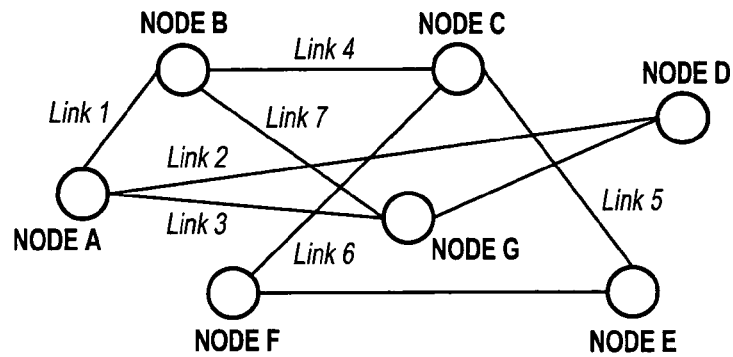
FIG. 1 discloses a multi-node network.

Description of FIG. 1

The present invention comprises an enhanced memory interface for increasing the traffic throughput of a multi-node communication network. This enhanced memory interface embodies traffic shaping elements that control the release of packetized information into a communication network such as that shown on FIG. 1. The FIG. 1 network has interconnected switching elements, termed nodes that communicate with one other. The nodes are designated A, B, C, D, E, F, and G and are connected by separate links designated link 1 through link 8. The nodes of FIG. 1 define a network that distributes traffic from inbound ports to outboard ports.

Figure 2:
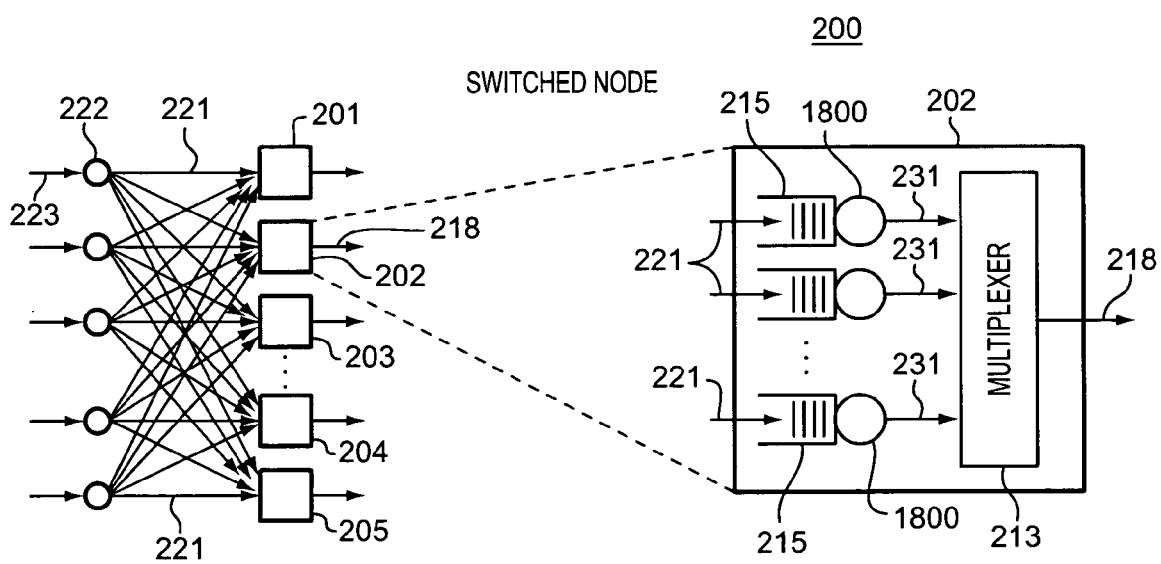
FIG. 2 discloses hardware elements comprising a node.
Figure 3:
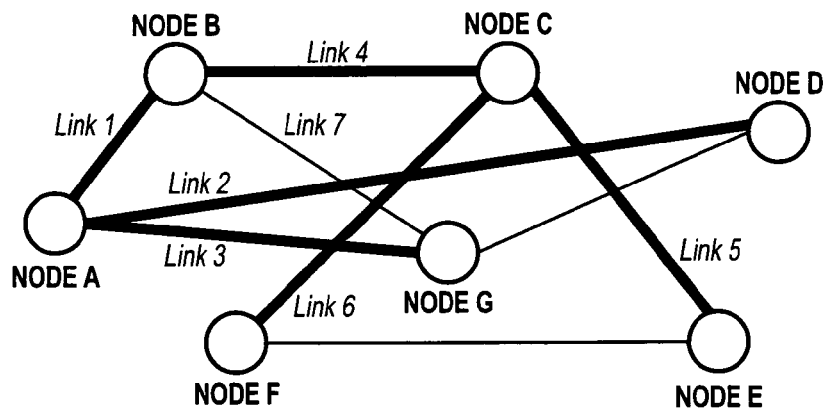
FIG. 3 discloses the multi-node network of FIG. 1 with blocking.

Description of FIGS. 2 and 3

FIG. 2 discloses the equipment embodying a node of FIG. 1. FIG. 1 discloses a single path (link 1) interconnecting Node A and Node B. Each node of FIG. 1 is connected with another node by incoming links and outgoing links. Node A receives from Node B by incoming links of Node A and transmits to Node B by means of the outgoing links of Node A.

FIG. 2 discloses the details of each node including its incoming links and outgoing links. Path 218 is an outgoing link of its node; path 223 is an incoming link of its node. FIG. 2 shows the equipment defining the node and on the left half of FIG. 2, the node comprises incoming links 223, splitters 222, and paths 221 interconnecting each splitter with each of the plurality of ports 201 through 205. Port 201 is connected on its right side to an outbound link 218 extending to another node. The equipment shown on the left side of FIG. 2 includes outbound ports 201 through 205 which permit the node to be connected to links 218 extending to five different nodes via the five outbound ports 201 through 205.

The right side of FIG. 2 illustrates the equipment embodying outbound port 202 in further detail. Port 202 includes a plurality of linked list queues 215, control logic 1800 individual to each queue. The control logic is illustrated subsequently in detail in FIG. 18 and comprises the equipment required to process the linked list information and extend it to multiplexer 213. Five queues 215 are served by the respective ones of control logic elements 1800 which are connected by paths 231 to multiplexer 213. Multiplexer 213 connects the paths 231 to outgoing link 218 which would correspond to any of links 1 through 8 on FIG. 1. The node of FIG. 2 is equipped with output queuing for maximum performance. For each outbound port 201–205 at any instance of time, one of the queues 215 is selected by multiplexer 213 and a packet from a queue 215 is sent to the outbound link 218. The selection of a queue 1800 for a given port depends upon the traffic shaping algorithm utilized by the network. Let it be assumed that several nodes of FIG. 1 wish to communicate with a small community served by one of the nodes such as Node A. Overload can occur as traffic contends for resource to Node A via a link to Node A. Packets are buffered allowing completed transmission as the contributing links are serviced.

This high traffic scenario is shown in detail in FIG. 3 with Node A being the in-demand node and darkened links 1, 2, 3, 4, 5, and 6 representing links serving possible circuit paths to in-demand Node A.

Node B bears the traffic of four nodes: itself, and three nodes (C, E, and F) that provide the traffic that traverses the Node B, and or Node C, to get to the Node A. Node B only has one link (Link 1) to Node A. Nodes G and D can supply traffic at full link capacity. The Link 1 is therefore overloaded. Node B must buffer traffic bound for Node A for the time of high-contention. Traffic is therefore sent as circumstances gradually become less contentious.

If the interval of high-contention persists long enough, the buffers in Node B can overflow. To prevent this, traffic shaping algorithms regulate release of traffic onto a link to allow the buffers throughout the network to drain and become ready to absorb more traffic bound for in-demand node. For example, Nodes E and F might not release traffic to the Links 5 and 6, respectively, even though they might have sufficient packets to fill these links. It would then take longer to send these packets, but in so doing Node B would avoid overload, and the network would drop fewer packets. Traffic shaping can be viewed as pro-active flow control.

Traffic shaping requires high performance buffering to succeed. This buffering relies on hardware linked list processors. A hardware linked list processor efficiently utilizes memory, dynamically assigns buffers to incoming packets, and collects buffers after their held data has been successfully transferred onto an outbound link.

Figure 4:
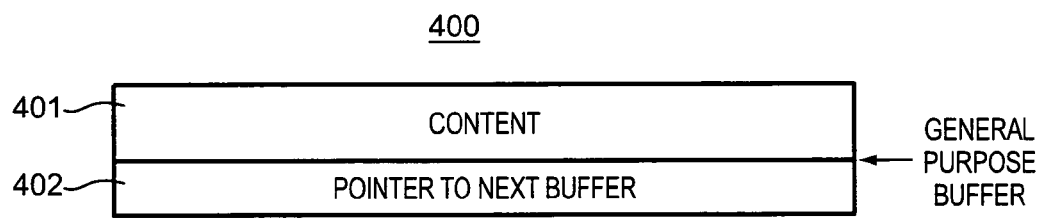
FIGS. 4–6 disclose an arrangement of linked list buffers.
Figure 5:
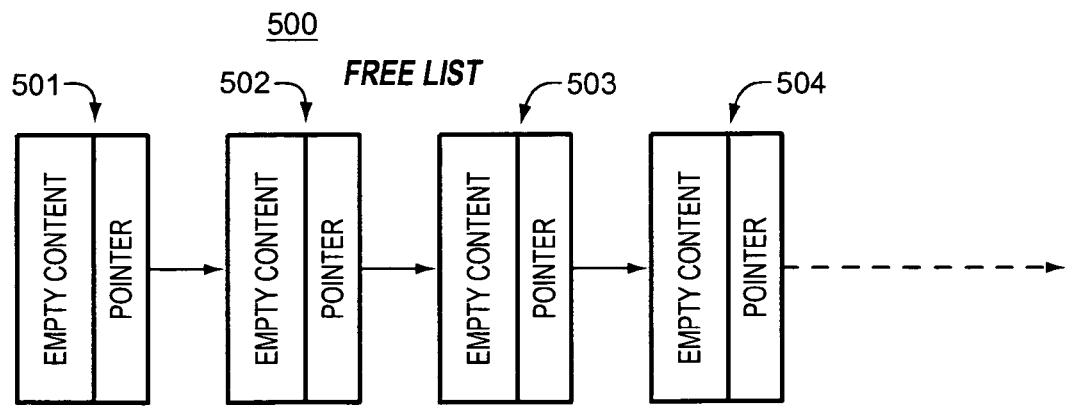
Figure 6:
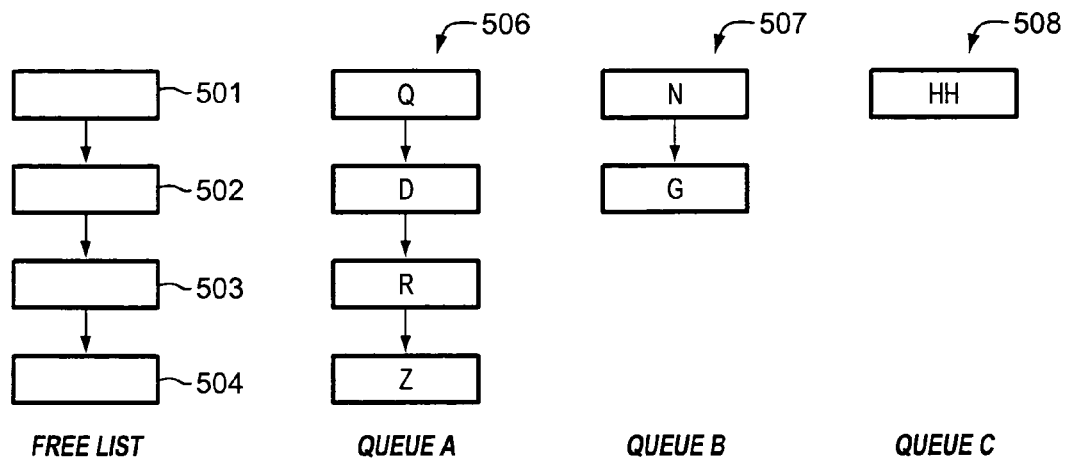

Description of FIGS. 4–6

A linked list buffer is in accordance with the present invention used for buffering information. In an initialized system, all memory is divided into generic buffers. Each buffer has room for the content 401 stored by that buffer, and a pointer 402 to the next buffer. This is shown in FIG. 4.

At initialization, all of the buffers are chained together by setting the pointer field of a previous buffer to the address of the next buffer. This is termed a free list and is shown in FIG. 5.

A communications system fills these generic buffers with information one by one and links the filled buffers into a queue which stores information for some specific function. After initialization of the system, all queues are empty. Their queue length is zero, and their head and tail point to NULL. As information arrives for a specific queue of FIG. 6, a generic buffer is taken from the free list, is populated with information, and is added to the list of the queue. The tail pointer is changed to the address of the added element of the queue, and the queue length count is incremented. When information is to be read from a queue, the content of the buffer at the head of the list of that queue is read and the head of the list is moved to the next buffer in the list. The queue length is also decremented.

Queue A on FIG. 6 has a head buffer with content Q and a tail buffer with content Z, queue B has a head buffer with content N and a tail buffer with content G, while queue C has a buffer having both a head buffer and a tail with content HH. This system has eleven buffers and three queues. A key feature of linked list buffering systems is that buffer allocation is entirely dynamic. Any distribution of buffers to queues is allowed, as long as the free list hasn't emptied. For example, queue A could have all eleven buffers, then some time later, queue A could have four buffers, queue B could have four buffers, and queue C could have three. Some time later, all the queues might be empty and all the buffers might again be in the free list.

Linked list buffering is especially suited to communications applications because arriving information consumes buffers at a constant rate for a given facility operating at full capacity. But, the facility must often multiplex information associated with more than one flow or stream. Linked lists are an efficient way to demultiplex and organize the inbound information for processing and subsequent multiplexing onto outgoing transmission media. After a processed buffer is transmitted, it can be recycled through the free list.

Suppose the aggregated traffic inbound to Node B of FIG. 2 consumes ten buffers per second, but Node B also transmits ten buffers per second. This node is balanced, because the buffers are emptied as fast as they are filled. From the standpoint of buffering, it doesn't matter which flows are coming or going. For example, it doesn't matter if the inbound traffic from Node C to Node B is destined for Node G or Node A. At one instant, the queues feeding Link 1 to Node A could be populated and the queues feeding the link to Node G could be empty, then some time later the first group could be empty and the second group could be full. As long as the overall flow is matched to the buffer capacity, system integrity is maintained. Yet, though overall traffic arrives and departs on the medium at a fixed maximum rate, many flows may be multiplexed in the supported communications medium. Flexible management of buffers mitigates transient equipment conditions.

A linked list buffer is useful in a traffic-shaping scenario. Each of the nodes supports some overall throughput. Implementation of traffic shaping insinuates buffering into the node since inbound traffic destined for certain outbound links must be buffered for a time interval before transmission in order to satisfy the shaping profile. In connectionless packet-oriented networks, the destination of an inbound packet is unknown before the arrival of that packet. Though a particular stream or flow may have an overall maximum rate, a given flow may burst information into a node. Since during that burst, the flow bursting can consume the entire link capacity, packet flows supported by the link destined for alternate nodes are by definition idle.

As an example, consider again the network of FIG. 3. Node B is connected to three links 1, 4, and 7. Traffic on Link 4 might be destined for either Node A or Node G. The series of packets destined for Node A constitutes the stream or flow to Node A from Node B. The series of packets destined to Node G constitutes the stream or flow to Node G from Node B.

Figure 7:
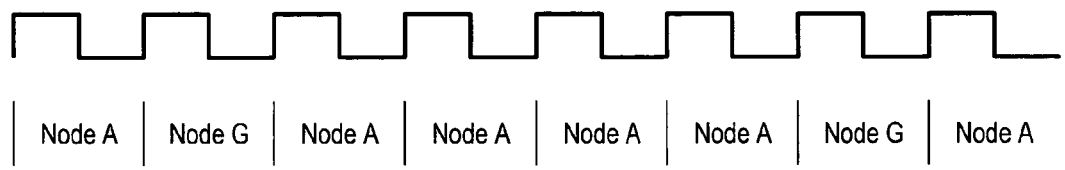
FIG. 7 discloses a hypothetical traffic condition on the node of FIG. 3.

Description of FIG. 7

FIG. 7 shows a timing diagram that describes a possible sequence of inbound packets on Link 4.

During the burst of four packets destined for Node A, the buffers that come off the free list are all added to the queue that supports Link 1. If this burst extends, the buffers taken from the free list stream into this queue. But, at any instant, the next inbound packet might be destined for either Node A or Node G. The destination of the next inbound packet isn't known until it's seen. Thus, a flexible dynamic allocation of buffers is necessary for operation of efficient packet switched equipment. During this burst of four packets, the queue supporting link 7 to Node G receives no additional buffers, but since the burst is dedicated to traffic destined for Node A, these queues don't have any inbound traffic because they don't need any more buffers. Thus, flexible dynamic allocation of buffers is sufficient for operation of efficient packet switched equipment.

Operation of a Linked List

Linked list engines employ semiconductor memories as RAM storage. The mechanics of manipulating a linked list for adding or removing buffers involve a series of reads and writes to both the buffer memory and to an associated linked list table memory. The linked list table memory is a static structure that contains a lookup table for heads and tails to each linked list supported by the linked list processor. For example, when a flow has either read or write traffic, the linked list processor first uses the flow number to look up addresses of the head and the tail of the interesting list. Knowing these addresses for the interesting linked list, the processor then can perform prescribed operations on that list. When a buffer is to be added to a linked list, an empty buffer is taken from the head of the free list of FIG. 6, and the head of the free list is rewritten to be the next empty buffer in that list. The address of the new head of the free list is contained in the link of the buffer just taken for filling. The content of that buffer is filled, and the link field in the buffer at the tail of the linked lists written with the address of the buffer just filled. Then, the table memory is written with the new tail address. In the process of writing a new buffer to a linked list, the table memory sustains a read and a write, and the buffer storage sustains two writes. In the process of reading a buffer from a linked list, the table memory sustains a read and a write, and the buffer storage sustains a read and a write. The write to the buffer storage occurs as the emptied buffer must be re-linked to the free list.

Linked List Processors Randomly Access Buffer Memory

An important aspect of this process is the random nature of the accesses to memory. A couple of factors contribute to randomization. When a linked list buffers traffic from a communication facility, the sequence of accesses is completely dependent upon traffic carried by that facility. In a connectionless network, such as Ethernet, a packet arriving on a facility might be destined for any of a number of queues as it is routed on its journey. The destination queue for a future packet cannot in general be predicted. The random nature of arrivals scrambles the addresses in a given queue. Though transmission of outbound packets is under control, the network conditions again contribute to randomization. For example, suppose a number of queues are to be multiplexed on an outgoing facility. At times, all of those queues might contribute, at times some, at times one or none. Congestion might be caused by far-end flow control of the outbound facility, or by a number of inbound facilities bearing traffic destined for the outbound facility.

A second significant factor contributing to randomization is the free list. Contributions to the free list depend entirely on the order of buffer transmissions onto outgoing facilities. But, outbound transmissions are subject to unpredictable conditions. Thus, traffic conditions randomize the address sequence of empty buffers on the free list.

Once a typical system using a linked list processor for buffer management purposes runs under significant load for a second or two, the accesses to buffer memory are completely lacking in any correlation.

Buffer Memory Access Parameters and Mechanics

Since linked list processing consists of a series of pre-scripted accesses to memory, the performance of the linked list processor heavily depends on how these accesses are managed. But, the ultimate buffering requirements, such as memory component availability and accessing arrangements, constrain memory system design for linked list processors.

The length of the attached facility and its capacity is imposed upon the memory system design when the linked list processor is used in a trunk switched application. For example, the standard reporting interval for a cable cut in a SONET network is 60 milliseconds. However, this standard is restrictive for commonly occurring network cable runs, where reporting intervals are more typically 200 to 300 milliseconds. This corresponds to a cable run length of thousands of kilometers. A single OC-768 fiber transmits more than 23 million packets in 300 milliseconds when bursting minimum sized packets. A fiber optic cable may have a hundred or more distinct and individual strands of traffic bearing fiber. So, a system terminating one such cable would need to buffer on the order of billions of packets to be able to recover seamlessly from a cable cut.

Fundamental Problem with Known Hardware Linked List Engines

A memory subsystem supporting hardware linked list processing must be big, fast, support many queues, and be capable of manipulating memory in any queue on any clock edge to accommodate instantaneous shifts in traffic presently available. Random access memories, which can suitably manipulate memory of linked list processor, either cannot cycle fast enough, or are not big enough to buffer highest capacity facilities.

These memories of two types, commonly available synchronous dynamic memory (SDRAM) packages contain up to a megabit of storage, but their random read-write cycle time is approximately 60 nanoseconds. Since storage on the order of megabits is needed for an OC-768 trunk, the size of the SDRAM is suitable, but for a fully-loaded OC-768 trunk bursting minimum size packets, a packet arrives every 40 nanoseconds. Thus, commercially available SDRAMs are too slow to serve an OC-768 facility.

Commonly available synchronous static memory (SSRAM) cycles random read-write accesses in approximately 2 nanoseconds, with a latency of 4 nanoseconds. This is fast enough to handle a few OC-768 facilities and the control overhead. But, SSRAM's are not available in capacities greater than 16 megabits. One would need approximately 90 SSRAM devices to adequately buffer an OC-768 facility. The amount of heat generated by that many SSRAM devices would be a problem.

In conclusion, a fundamental problem with the memories available formed with hardware linked list processors is that they either are big and slow (SDRAMs), or fast, but too small (SSRAMs). There is no compromise available that leads to a hardware linked list processor that is both big and fast.

The Improved Linked List Processor Design

The improved linked list processor of the present invention embodies a solution to the problem of how to obtain a large capacity, high-density buffer, as well as a fast, high-performance buffer. It does so in a novel way by relying on the random nature of the stream of accesses to the memory.

The problem of contention for memory subsystems using SDRAM has heretofore caused the systems to wait for each successive memory cycle to be completed instead of overlapping accesses by using the pipelined feature of available SDRAM. This would enable the system to operate at the much faster bus cycle rate. The present invention solves the contention problem by allowing RAM memory to operate at its port speed, namely hundreds of megahertz, instead of its inherent random read-write access speed, namely dozens of megahertz. Another feature of the invention is that in the presence of a random access stream to banked RAM memory, more memory banks are used because as the number of banks increase, the probability decreases that the next access is directed at an already-busy bank.

Figure 8:
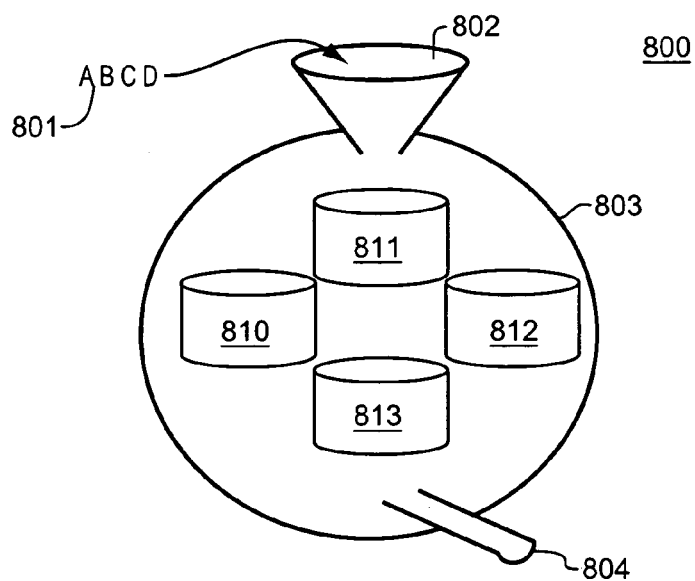
FIGS. 8 and 9 disclose the processing of access requests by a network served by a plurality of RAM memory banks.
Figure 9:
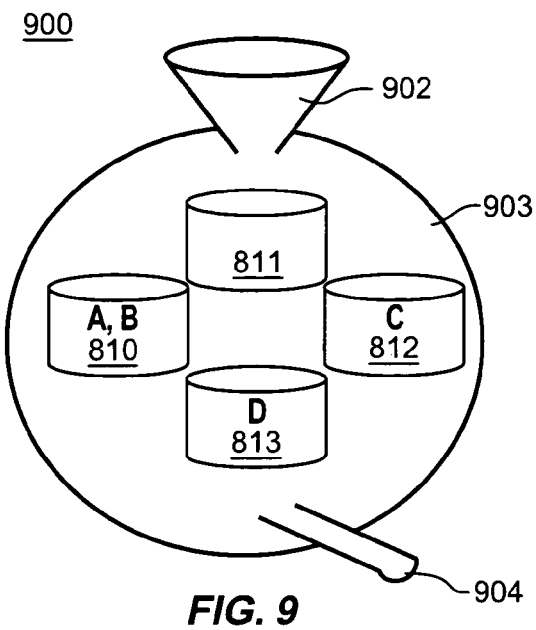

Description of FIGS. 8 and 9

Dynamic RAM comes packaged with multiple banks in a single package. A bank is a separately addressable unit of storage. Since banks share input/output resources such as pins on the physical package, multiple banks may concurrently process access requests. The maximum number of outstanding requests that can be served depends on the clock speed and the construction of the synchronous SDRAM device. As an approximation, if an access to a bank in the SDRAM takes four clock cycles to complete, and there are four or more banks in a package, then four accesses can be concurrently in process. A fresh access is enabled on each rising edge of the four clocks involved with completing the first access.

FIG. 8 shows the four banks 810, 811, 812, and 813 in circle 803. This represents four banks in a possible SDRAM. Funnel 802 and spout 804 represent the shared control and data bus resources for access to what's inside the SDRAM. Four access requests A, B, C, D (801) are shown entering funnel 802 of SDRAM 803.

Only one access request A, B, C, or D can enter funnel 802 at a time. Each bank 810–813 takes as much time with an access as the others. If a bank starts request A, and later another bank starts request B, the results for request A will emerge from spout 804 before the results from request B. But for a time, one bank will be working on request A and another bank will be concurrently working on request B.

The accesses may be served by any combination of banks. They could all be served by the same bank, or they could be served by different banks. Some accesses will have a bank to itself, but other accesses will share a bank. For certain groups of accesses, a bank might not be in use at all. For example, accesses A and B might be served by the same bank 810, access C by bank 812, and access D by bank 813, as in FIG. 9. The process of distributing a group of accesses to the available banks is called partitioning. From the perspective of the banks, the count of accesses is a vital piece of information, because all accesses have uniform character. So, a partition is an accounting of accesses to the banks. For example, {4,0,0,0} means that four accesses occupy a single bank, and the other three banks are unoccupied. In FIG. 9, the partition is {2,1,1,0}.

Description of FIGS. 10–13

Figure 10:
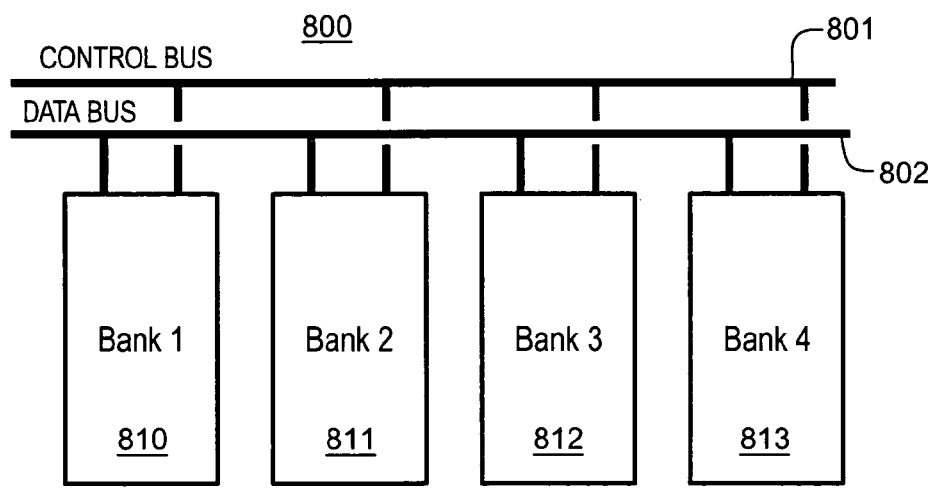
FIG. 10 discloses four RAM memory banks connected to a control bus and a data bus.

The synchronous dynamic RAM (SDRAM) of FIG. 10 is a four independent bank memory architecture. For each bank, operation involves access latency, the delivery of information from the pins to the memory array for a write operation, or delivery of information from the memory array to the pins for the read operation. There is also a required pre-charge interval to allow sense amplifiers internal to the memories to prepare for the next read or write cycle. Each of the four banks is available. Each of the four banks has its own sense amplifiers so accesses contend only for the control and data ports of the SDRAM.

Figure 11:
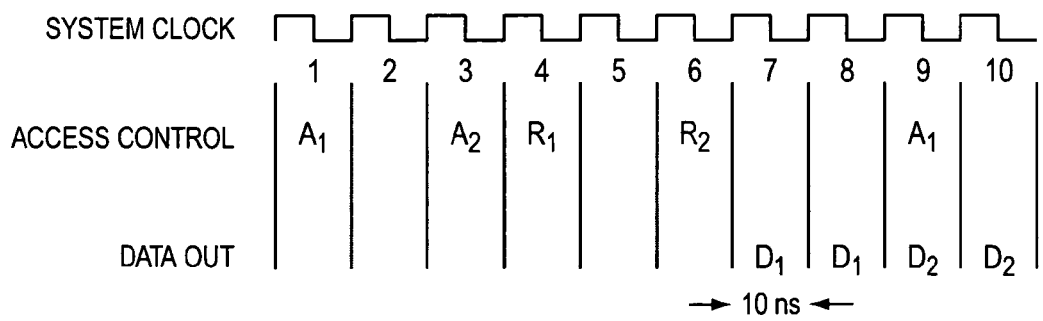
FIG. 11 is a timing diagram describing the process by which the RAM memory bank of FIG. 10 serves access requests as shown on FIGS. 8 and 9.

FIGS. 10 and 11 show that the control bus 801 accommodates activity directed at banks 1 and 2 of an SDRAM. There is latency between the access commands "A" and the associated read commands "R" of FIG. 11. There is also latency between the read commands and the availability of data. In addition, there is latency between access commands A1 and A2. On FIG. 11 a clock cycle of 10 nanoseconds is used for convenience. The overall cycle time is 80 nanoseconds. All four available banks of the SDRAM may be accessed during this time, but any bank may only be accessed once within this interval. With these latencies, the SDRAM is said to have a pipeline depth of four stages. Satisfaction of a collision instance requires an additional 80 nanoseconds cycle of the memory. A collision instance is defined as the arrival of an access flow regulator to a busy SDRAM memory bank. For example, if an access request for bank 1 arrived on clock cycle 2 of FIG. 11, it could not be applied to the memory until clock cycle 9, since request A, for bank 1 arrived on clock cycle 1.

Figure 12:
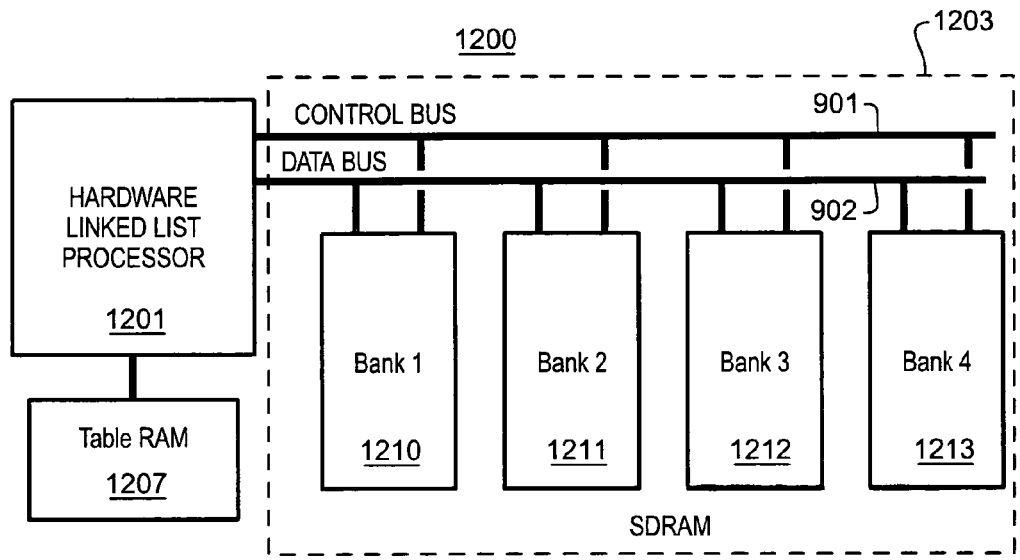
FIG. 12 discloses a linked lists processor controlled memory system having four RAM memory banks.
Figure 13:
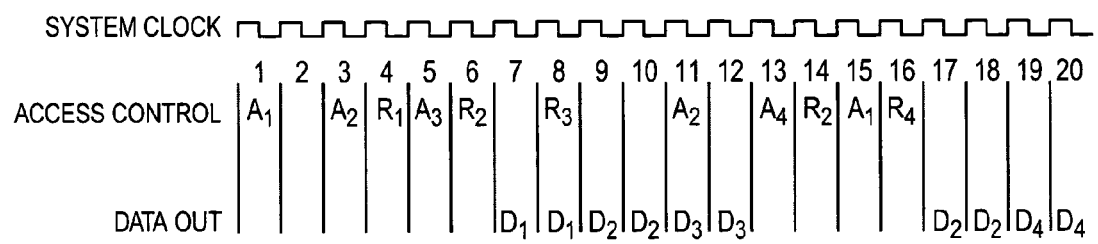
FIG. 13 is a timing diagram illustrating the operation of the system of FIG. 12.

FIG. 12 shows a hardware linked list processor 1201 using SDRAM 1203 as its buffer storage and a smaller synchronous static RAM 1207 for table storage which holds the head, tail, and count for each supported flow. SDRAM 1203 has four SDRAMs 1210, 1211, 1213, and 1214. Suppose linked list processor 1201 encounters a stream of 5 access requests as shown in FIG. 13 for clocks 1, 3, 5, 11, and 15. The first three accesses A1, A2, and A3 can be pipelined because they go to different banks, but the fourth access A2 on clock 11 must be delayed because it goes to busy bank 2 serving the access A2 of clock 3.

In general, the average amount of contention encountered in the presence of a random stream of accesses can be taken as a measure, for a four bank SDRAM. It's simpler to calculate the weighted average access time for a block of accesses to a four bank SDRAM because the banks share only the input/output facilities. For example, consider the partition {3,1,0,0}. If the accesses are labeled (A,B,C,D), the viable groupings are {(A,B,C),(D)}, {(A,B,D),(C)}, {(A,C,D),(B)}, and {(B,C,D),(A)}. The two banks chosen could be {1,2}, {1,3}, {1,4}, {2,3}, {2,4}, or {3,4}.

There are two ways to map a partition of three and a partition of one into two banks. For example, if we try to map the partition {(A,B,C),(D)} into {1,2}, it could be either (A,B,C) with bank 1 and (D) with bank 2, or (D) with bank 1 and (A,B,C) with bank 1. Since 4*6*2=48 and there are 256 ways to place four accesses, the probability that the partition {3,1,0,0} will occur is 0.1875. The stray access can be pipelined inside two conflicting accesses, so the number of clocks to complete will be 8*3=24.

TABLE 1

Placement of Four Transactions into Four Memories

| Partitions | Probability | Clocks to Complete | Weighted Average Time to Complete |
|---|---|---|---|
| 4, 0, 0, 0 | 0.0156 | 32 | 0.5 |
| 3, 1, 0, 0 | 0.1875 | 24 | 4.5 |
| 2, 2, 0, 0 | 0.1406 | 19 | 2.6714 |
| 2, 1, 1, 0 | 0.5625 | 16 | 9.0 |
| 1, 1, 1, 1 | 0.0938 | 14 | 1.3125 |

Table 1 illustrates data pertaining to the various possible distributions of access to four memory bank together with relevant data shown for each possible distribution. Column 1 of table 1 lists the various possible partitions into which accesses to the various banks can be made. Top row of table 1 indicates that the first bank gets four accesses while the remaining banks get none. Distribution of column 1 line 2 is 3,1,0,0. The distribution of the lower row of column 1 indicates that all of the four accesses are distributed evenly one to each bank. Column 2 indicates the probability of each distribution for its row. Column 3 indicates the number of clock cycles to complete the function. Column 4 indicates the weighted average time to complete. For row 1, the probability of the distribution of all four accesses to the first bank is 0.0156. This requires 32 clock cycles to complete with a weighted average time to complete of 0.5. The lower row having the distribution of 1,1,1,1, a probability of 0.0938 and it requires 14 clock cycles to complete with a weighted time average of 1.3125. From this table it can be seen that most probably distribution is 2,1,1,0 with a probability of 0.5625. The best possible distribution is shown on the lower row and which has a probability of 0.0938.

For the four banks of Table 1, the total weighted average time to complete four accesses is 17.98 clocks. This figure is the sum of the weighted times to complete for all the possible combinations of accesses to a four bank memory. Assuming a pipeline clock of two 10 nanosecond system clocks and a 16-bit wide bus, the average sustainable throughput for a four bank SDRAM is 1.24 GBits/second, since each memory transaction involves 16 bits for two clocks apiece. The contention overhead is 28.5%. This value is calculated by dividing the difference between the average time to complete an access and the shortest possible time to complete an access by the shortest possible time to complete an access. For example, suppose the average time to complete an access was 50 nanoseconds, and the shortest possible time to complete an access was 40 nanoseconds. Then the overhead would be 25%.

Figure 14:
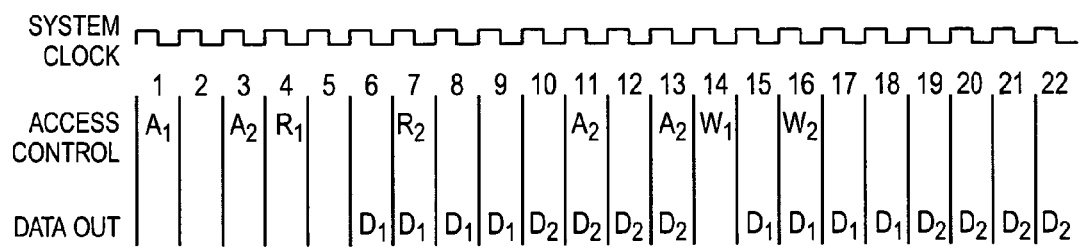
FIG. 14 is another timing diagram illustrating an alternative operation of the system of FIG. 12.

FIGS. 13 and 14 illustrate the difference between accesses that are not contentious and accesses that are contentious.

Description of FIG. 14

Frequent contention influences design decisions. Consider the timing diagram of FIG. 14. Here, the access bus to the memory banks is slotted. Each access has an interval to read and an interval to write. These accesses must be packed as closely together as possible to minimize idle time on the control bus of the memory.

Structuring the accesses in this way makes sense because contention increases the average read-write cycle time of the memory substantially. Since the average read-write cycle time is on the order of the maximum read-write cycle time, it becomes more efficient to engineer the system for the maximum read and write cycle time of the memory. The increase in efficiency and operating speed to use a lesser-read-write cycle is not worth the cost of hardware required to manage contention.

The memory can accept access requests at a rate defined by its bus speed, since its internal pipeline design enables it to do so. But, at a contention rate of 28.5%, queuing in this system, as opposed to a more contention-free system, increases dramatically since contention rate is related to queue depth exponentially. The queuing and state control apparatus to support a varying access time is much more elaborate than the one that anticipates a constant, maximum access time. For example, a design having a constant, maximum access time requires no queue, and state control throughout is fairly simple. A design having a variable access time frequently requires more than one queue within the machine that is using the memory, plus more elaborate state logic to enable the application to stop and start this machine when contention happens.

Figure 15:
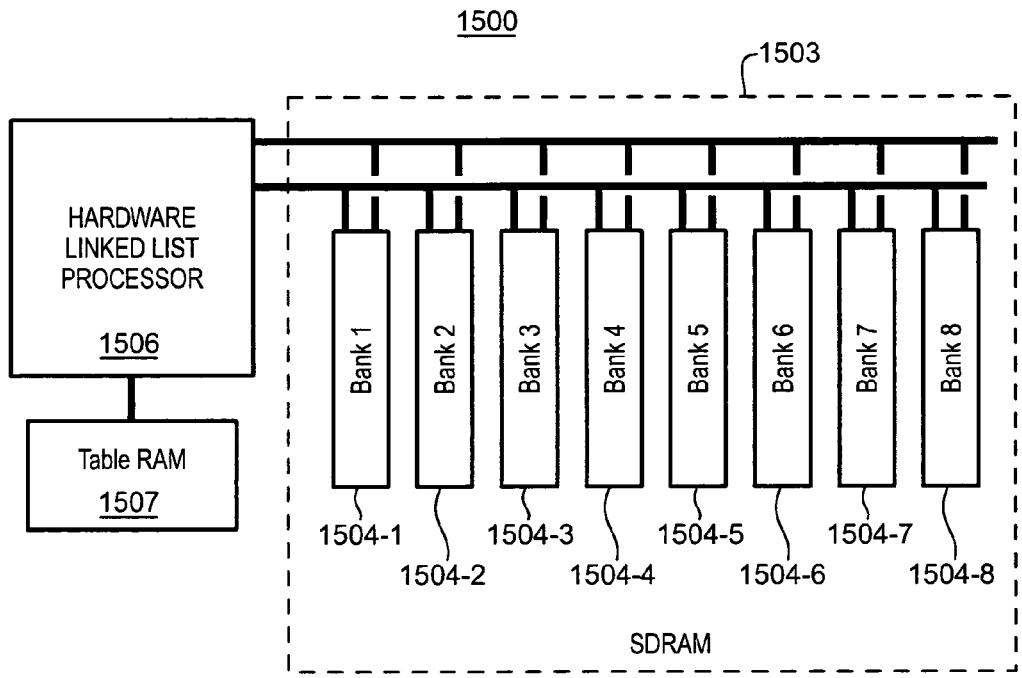
FIG. 15 discloses a processor controlled linked lists processing system having eight RAM memory banks.
Figure 16:
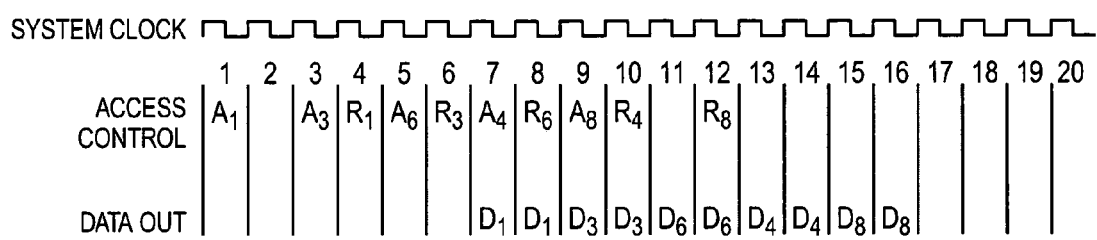
FIG. 16 is a timing diagram illustrating the operation of the system of FIG. 15.

Description of FIGS. 15 and 16

Assume there are eight banks of SDRAM, as shown in FIG. 15. In this case the memory is partitioned into blocks half the size of the SDRAM shown in FIG. 13. For example, accesses destined for Bank 1 in FIG. 13 now go either to Bank 1 or Bank 2 in FIG. 16. Accesses destined for Bank 2 in FIG. 13 are divided between Bank 3 and Bank 4 in FIG. 16, and so forth. In FIG. 13 the second access to Bank 2 contends with the first access to Bank 2 and causes delay. In FIG. 16, the first of these accesses goes to Bank 3, but the second of these accesses goes to Bank 4.

Comparing FIGS. 13 and 16 reveals that relief of contention closes the idle gap between clock 13 (A4) and clock 16 (R4) in FIG. 13. In FIG. 16, the data bus is continuously occupied from clocks 7 to clock 16. Contention can occur in different combinations given a random inbound stream of accesses. Contention is not eliminated with eight banks, but the probability that contention will occur is reduced as the number of banks is increased.

TABLE 2

Weighted Average Time to Complete Four Accesses for Quantities of Banks

| Banks | Weighted Average Time to Complete | Contention Overhead | Maximum Sustainable Throughput (GBit/sec) |
| --- | --- | --- | --- |
| 4 | 17.98 | 28.5% | 1.24 |
| 5 | 17.06 | 21.9% | 1.31 |
| 6 | 16.47 | 17.6% | 1.36 |
| 7 | 16.06 | 14.7% | 1.39 |
| 8 | 15.77 | 12.6% | 1.42 |
| 9 | 15.55 | 11.1% | 1.44 |
| 10 | 15.38 | 9.9% | 1.45 |
| 11 | 15.24 | 8.9% | 1.47 |
| 12 | 15.12 | 8.0% | 1.48 |
| 13 | 15.03 | 7.4% | 1.49 |
| 14 | 14.95 | 6.8% | 1.5 |
| 15 | 14.88 | 6.3% | 1.5 |
| 16 | 14.82 | 5.9% | 1.51 |

Table 2 shows how the weighted average time to complete decreases with an increasing number of banks. Maximum sustainable throughput again assumes a 10 nanosecond system clock and a 16-bit wide data bus.

Pipeline depth also affects performance. For example, if there are eight banks of memory but there are only two stages in the pipeline, the weighted average time to compete two accesses is 6.25 clocks. The overhead for this case is 4.2% and the maximum sustainable throughput is 1.51 GBits/sec. Suppose the contention rate drops to 5%. Then the average access time is 3.5 nanoseconds. This is fairly close to the bus cycle time. The consequences of this are seen in a comparison of the Access Control arrangements shown in FIG. 14 and FIG. 16. It's seen that the density of control bus activity is greater in FIG. 14, meaning there are more random read-write accesses on a per-clock basis than in FIG. 14.

Figure 17:
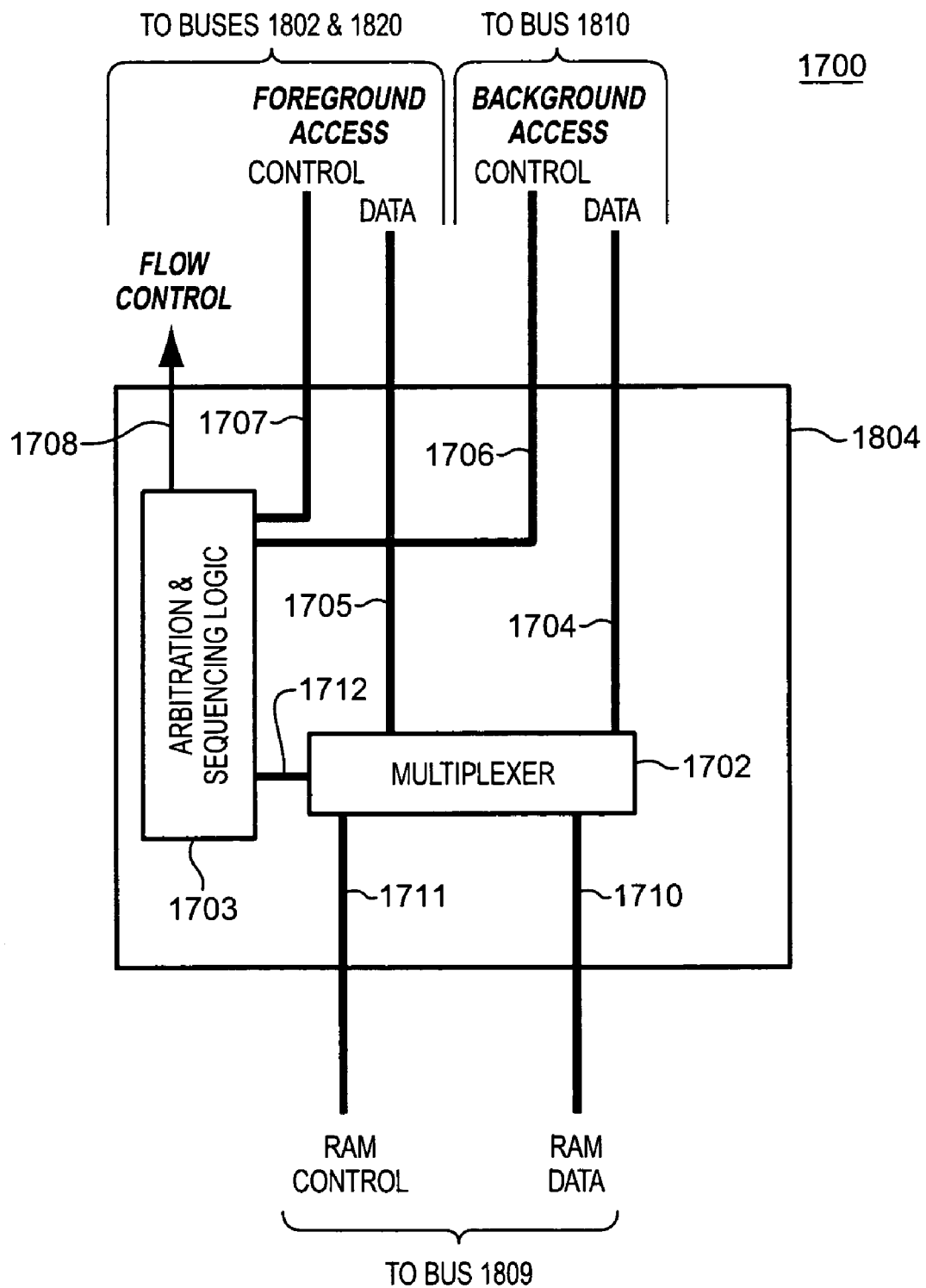
FIG. 17 discloses elements of state controller 1804 of FIG. 18.
Figure 18:
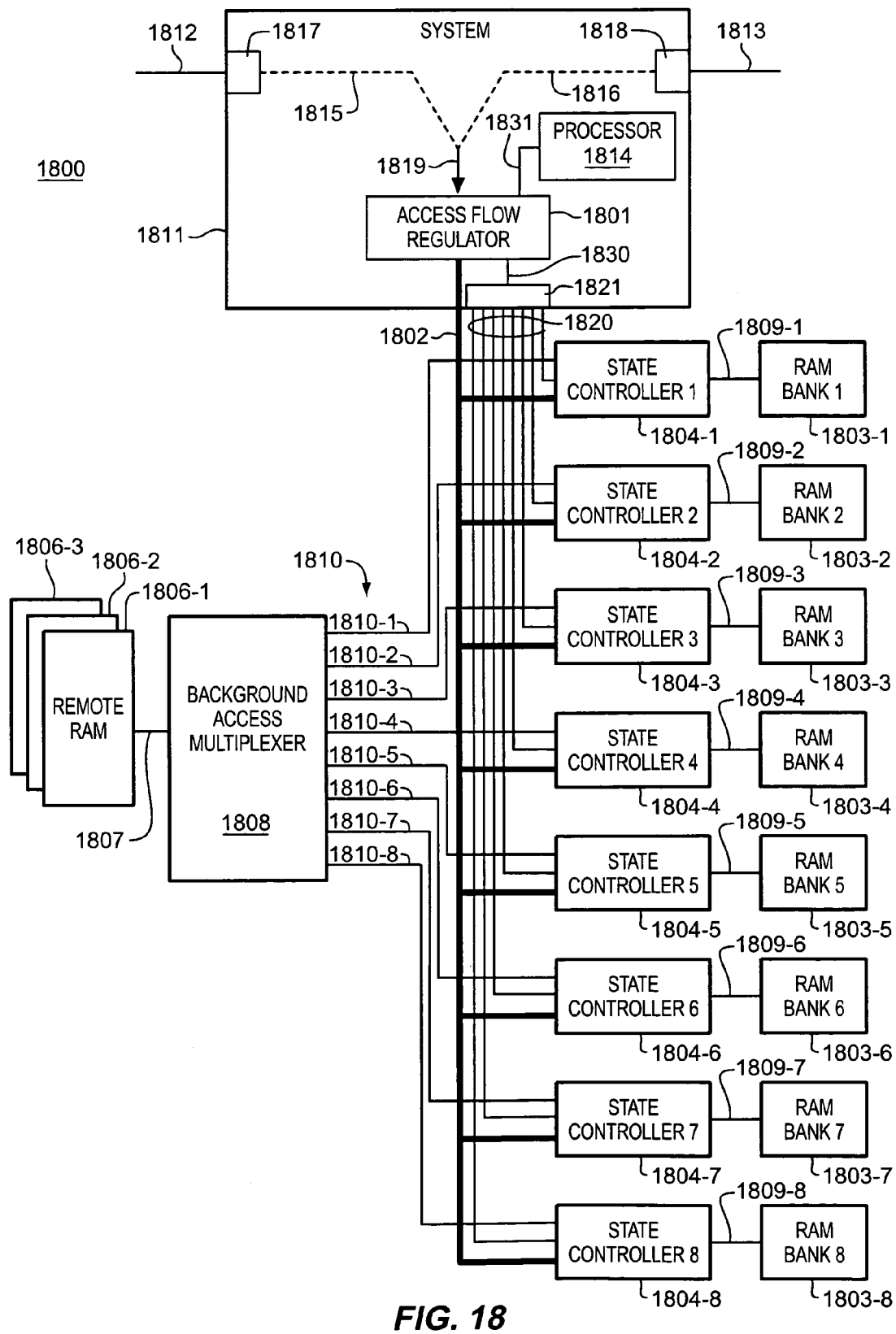
FIG. 18 discloses a processor controlled RAM memory system embodying the present invention.

Description of FIGS. 17 and 18

In accordance with the present invention, independent cooperating state controllers 1804 are assigned to each bank 1803 of a RAM package. Each bank is allowed to cycle independently and, through its state controller 1804, seamlessly contribute results in a coordinated way with the other RAM banks 1803. In addition, the state controllers 1804 flow control the access flow regulator 1801 queue holding the access requests in the event of occasional contention. This prevents the dropping of access requests. The state controllers 1804 also independently manage housekeeping functions, such as bank 1803 refresh. The state controllers 1804 are independent. A state controller 1804 facilitates background burst transfers to and from its RAM bank 1803 concurrent with foreground access activity in other RAM banks 1803. This allows the middle section of a linked list to be stored in a remote RAM 1806 from RAM banks 1803. This leaves only the heads and tails of a linked list in the RAM banks 1803. For example, referring to Queue 506 in FIG. 6, buffers Q and Z would be located somewhere in RAM banks 1803, but buffers D and R are stored in remote RAM 1806. The ability to store the middle of a linked list remotely allows the disclosed system to support lists of arbitrary size using commercially available packaged RAMs. If the bulk of a linked list can be stored remotely in remote RAM 1806, the RAMs 1803 embedded in FPGA's can be used for the heads and the tail. The state controllers 1804 are combined with the RAM 1803 holding the heads and tails. This design is more efficient than state controllers residing in a package different than the RAMs 1803. Co-location of RAMs 1803 and state controller presents technology choices for storing the heads and the tails of the list. These choices are on-board registers for few linked list queues, static RAM 1803 for a moderate amount of linked list queues, or dynamic RAM 1806 for a large number of linked list queues.

A block diagram of the state controller 1804 is shown in FIG. 17.

State controller 1804 is governed by the arbitration and sequencing logic that gates the flow of information in from the foreground port, and guards the RAM memory bank 1803 from new incoming activity when it's busy with either a foreground or background transfer. In addition, the state controller monitors conditions in the RAM memory bank 1803 and determines when interactions with remote RAM 1806 are to occur. The state controllers 1804 fit together into a system with background access multiplexer 1808, remote RAM 1806, and an access flow regulator as shown in FIG. 18.

State controller 1804 on FIG. 17 functions as an interface between its associated RAM memory bank 1803, access flow regulator 1801 and background access multiplexer 1808. The connections to these elements are shown in detail on FIG. 17. State controller 1804 includes multiplexer 1702 and arbitration and sequencing logic element 703. On its lower side, multiplexer 1702 is connected to paths 1710 and 1711 which become a part of bus 1809-1 through 1809-8 of FIG. 18. It is over this path that the multiplexer exchanges data on read and write operations with its associated RAM memory bank via path 1710. Path 1711 is a bidirectional control path that enables state controller 1804 via multiplexer 1702 to control the operation of its associated RAM memory bank 1803. The RAM data path 1710 can be connected via the multiplexer to either the data path 1704 or the data path extended to the background access multiplexer 1808 or via data path 1705 and bus 1802 to the access flow regulator 1801. These data paths can be used on both read and write operations.

The RAM control path 1711 on the bottom of multiplexer 1702 is connected via path 1712 and the arbitration and control logic element 1703 to paths 1707 and 1706. Path 1711 of the multiplexer is connectable to only one of paths 1707 and 1706 at a time. When connected to path 1706, it is further extended over path 1810 to control the operation of the background access multiplexer 1808 and its associated remote RAM 1806 on both read and write operations. When path 1711 is connected to path 1707 via element 1703, it is further extended via bus 1802 to the access flow regulator 1801. The arbitration and sequencing logic element 1703 contains the intelligence and logic required to control access flow regulator 1801 on its exchange of data with a state controller 1804 on both read and write operations. The arbitration and sequencing logic 1703 also communicates via bus 1706 and 1810 with the background access multiplexer 1808 to control its operations when remote RAM 1806 receives data from a RAM memory bank 1803 as well as operations in which remote RAM 1806 transmits data to a state controller 1804 for entry into the RAM memory bank associated with the state controller.

State controller 1804 has four high level functions in its exchange of control and data with its associated RAM memory bank 1803 and with the access flow regulator 1801 and with remote RAM 1806 via the background access multiplexer 1808. These four high level functions are next described.

The first function performed by the state controller 1804 of FIG. 17 is to initiate and control the inbound access request sequences associated with the transfer of information from access flow regulator 1801 on read or write requests and, in so doing, to control its associated RAM memory bank 1803 to write data into RAM memory bank 1803 on a write requests and to read data from RAM memory bank 1803 on a read requests from access flow regulator 1801.

A second function performed by the state controller of FIG. 17 is to respond to trigger signals that detect a buffer fill level within its associated RAM memory bank 1803. This trigger indicates that its buffers within its associated RAM memory bank have become either sufficiently consumed or depleted. When buffers within its associated RAM memory bank are sufficiently consumed, a write to the remote RAM 1806 is triggered. When buffers within its associated RAM memory bank are sufficiently depleted, a read from remote RAM 1806 is triggered.

A third function performed by the state controller 1804 is to initiate and manage transfers from its associated RAM memory bank 1803 to the remote RAM 1806 and also to manage data transfers in the reverse direction back to RAM memory bank 1803 from remote RAM 1806.

A fourth function performed by state controller 1804 is to wait for a signal from multiplexer 1702 and to initiate transfer from and to remote RAM 1806 upon receipt of that signal from multiplexer 1702.

Another function performed by multiplexer 1702 is to select which bidding RAM memory bank 1803 is to have access to remote RAM 1806 in the event that a plurality of RAM memory banks 1803 are simultaneously requesting access to remote RAM 1806. Another function performed by multiplexer 1702 is to initiate the transfer and scheduling functions associated with operations between remote RAM 1806 and a bidding RAM memory bank 1803, in the event of dependencies between said transfers. Such dependencies can arise from streamed accesses into and out of the memory system.

Yet another function performed by multiplexer 1702 is to control the RAM memory bank 1803 to direct a write entry from remote RAM 1806. Multiplexer 1702 grants access to remote RAM 1806 and routes information between remote RAM 1806 and RAM memory bank 1803.

Table 2 shows that RAM bank 1803 contention can limit performance of a system based on conventional SDRAM.

The discussion of FIG. 14 demonstrates that this limitation can be so severe that systems have been designed around RAM memory bank contention. The design of FIG. 14 avoids contention on every cycle by structuring the accesses for the time interval of full RAM memory cycle time as opposed to a contention based upon anticipating RAM bank availability. This means that the RAM memory bank runs slower than optimum speed, by design. FIGS. 12 and 13 describe a system that anticipates bank availability, but must have substantial extra logic in the event of contention. The problem with this implementation is that contention saps performance and that the additional hardware required doesn't provide enough performance gain.

FIGS. 15 and 16 provide improved operation by increasing the number of RAM memory banks to decrease the amount of contention. This requires increased hardware logic. The relationship between the increase in performance and the increase in hardware is such that an acceptable amount of additional hardware can make an appreciable difference in performance. In order to coordinate accesses to the many RAM memory banks, one requires specialized state logic, such as that which is shown in FIG. 17, which consumes hardware resources. These resources can be found within commercially available FPGA's. In order to maximize performance, a wide, maskable data bus is preferred. It should be wide to smoothly absorb bursting data, and also be maskable to facilitate storage of the smallest quantum of data. Memory that is configurable in this manner is available in commercially available FPGA's. But, this memory is available only in smaller quantities that are insufficient for substantial buffering jobs, such as buffering 300 milliseconds of an OC-768 optional fiber as priorly discussed. In addition, there is a limited amount of space available within an integrated circuit. What is used for RAM memory cannot be used for state controller logic, and vice-versa. But, more RAM banks mean greater performance, and each bank must have its own state controller. So, there's a conflict between satisfying buffering requirements and the performance of the system.

A solution to this conflict is to limit the amount of memory aboard the FPGA RAM bank 1803. Only the head and tail of a linked list is accessed, and the middle elements of a linked list are always idle until such time as they move to the head of the list. So, moving the middle elements of the linked list off-board from the FPGA RAM bank 1803, to remote RAM 1806, enables higher performance.

A system implementing this compromise is shown in FIGS. 17 and 18.

This solution is sensible for economic reasons, also. Configurable banks of RAM memory are much more expensive on a per-bit basis than commercially-available SDRAM. If the remote RAMs 1806 holding the middle elements of the linked list aren't being accessed, then the cycle-time penalty associated with that memory isn't being paid. Ultimately, the remote RAM 1806 has to be accessed to store and retrieve the elements in the middle of the list. But, the configurable nature, referred to above, of the many banks of memory on the FPGA allows design that is compatible with the burst mode of the SDRAM RAM bank 1803. One could match the throughput of the system of many banks of memory to the SDRAM, achieving a balanced design. This minimizes the cost of the SDRAM cycle time by allowing the SDRAM 1803 to work in burst mode, so the cycle time can be pipelined with the data synchronously clocked on the data bus. This returns the memories to the operational mode for which they were designed, as well.

Link list buffers are deposited to or retrieved from remote RAM 1806 via background access multiplexer 1808. This permits the foreground accesses to proceed free of this additional traffic. This is important because the probabilistic model illustrated by Table 2 relies on an available foreground bus as shown in FIG. 18. Blockage of the foreground bus 1810 in-progress background transfer to remote RAM 1806, substantially complicates the model used to produce Table 2. This would degrade performance. The background access bus 1810 is shown.

FIG. 18 discloses a linked list engine 1800 embodying the present invention. Linked list engine 1800 is shown connected to a communication system 1811 which has incoming and outgoing paths 1812 and 1813 connected to ports 1817 and 1818. The system includes a processor 1814 and further includes paths 1815 and 1816 extending over path 1819 to access flow regulator 1801. In its operation, system 1811 performs read and write operations with the memories of the linked listengine 1800 to store the data required by the ports 1817 and 1818 in their operation.

Access flow regulator 1801 and bus 1802 are connected to a plurality of state controllers 1804 each of which is associated with one of RAM memory banks 1803. Access flow regulator 1801 receives write requests from system 1811 requesting the storage of information in one of RAM memory banks 1803. Access flow regulator 1801 receives and stores these access requests and dispenses them selectively to the various state controllers 1804 for the entry of the data into an associated RAM memory bank 1803. The process works in the reverse direction on memory read operations when access flow regulator 1801 receives a read requests from system 1811 and, via state controllers 1804, causes the RAM memory bank 1803 containing the requested data to be read out and applied via state controller 1804 and bus 1802 back to access flow regulator 1801 which transmits it to system 1811.

The RAM memory bank devices 1803 are high speed elements having a relatively small memory storage capacity that is augmented by remote RAM 1806 which can receive information from a RAM memory bank 1803 and store it when the information is not immediately required by the RAM memory bank. Remote RAM 1806 is assisted in its operation by background access multiplexer 1808 and bus paths 1810 each of which extends to a unique state controller 1804 and its associated RAM memory bank 1803. By this means, a RAM memory bank 1803 that is becoming full or empty can signal this to its associated state controller 1804 which then communicates via bus paths 810 with background access multiplexer 1808. Multiplexer 1808 assists the state controller 1804 in reading information from its RAM memory bank 1803 and transferring it to remote RAM 1806 for temporary storage until such time as the information is again needed by the RAM memory bank 1803 from which it came. At this time, RAM memory bank 1803 signals its state controller 1804 that the remote RAM 1806 contains information that is about to be required by the RAM memory bank. Background access multiplexer 1808 and state controller 1804 then together cause the appropriate portion of the remote RAM 1806 to be read out information to be transferred back to the RAM bank 1803 from which it originated. Remote RAM 1806 is a relatively slow speed bulk memory element which can efficiently store information overflowing from a RAM memory bank 1803 or supply information to an under flowed RAM memory bank 1803.

An aspect of the present invention includes the method and apparatus of FIG. 18 wherein a write operation into a RAM memory bank 1803 is executed by the steps of writing linked list information into a RAM memory bank 1803 via its state controller 1804; continuing the write operation to the RAM memory bank 1803 until it is approaching a full state; continuing to write additional information from access flow regulator 1801 into the RAM memory bank while concurrently reading some of the newly received information out of RAM memory bank 1803 via its state controller 1804 and background access multiplexer 1808 into remote RAM 1806. This information remains in remote RAM 1806 until it is subsequently needed by the RAM memory bank 1803 from which it came.

The system of FIG. 18 performs a read out of data from a RAM memory bank 1803 by the steps of signaling the state controller 1804 associated with the RAM memory bank 1803 containing the requested data; initiating a read out of the selected data via the state controller 1804 and bus 1802 back to the access flow regulator 1801; continuing the read out of the selected RAM memory bank 1803 and concurrently determining that these reads have exhausted selected RAM memory bank 1803 of interesting data, and that some of the interesting data required on subsequent read operations is currently stored in remote RAM 1806; initiating a pre-fetch read out of remote RAM 1806 to transfer the information back to the RAM memory bank 1803 from which it originated before it is requested; and continuing a read out of the selected RAM memory bank 1803 and, if necessary, a continuing read out of data from remote RAM 1806 back to the RAM memory bank 1803 being read out. This operation continues until the entirety of the information requested by access flow regulator 1801 on the read operation is accomplished.

The high speed memory devices of RAM memory bank 1803 and the lower speed bulk memory of remote RAM 1806 work cooperatively to store data exceeding the capacity of the high speed RAM memory banks 1803. Remote RAM 1806 receives this data on write operations from a RAM memory bank being written while enabling the RAM memory bank 1803 to continue to receive further data at high speed from access flow regulator 1801. The process works in the reverse direction on a read operation when a RAM memory bank 1803 is initially read out at high speeds; the data required by the RAM memory bank and stored in remote RAM 1806 is transferred back to the RAM memory bank 1803 when the RAM memory bank 1803 is exhausted of interesting information, in a pre-fetch arrangement. The read operation may continue with all of the pertinent information in the remote RAM 1806 being transferred back to the high speed RAM memory bank 1803 which continues to be read out at a high data rate until the entirety of the information requested by access flow regulator 1801 is transmitted by the high speed RAM memory bank 1803 back to the access flow regulator 1801 via the state controller 1804 and bus 1802. Or, state controller 1804 and RAM memory bank 1803 may pursue a write operation separate from the previous read operation that triggered the background retrieval. Since the pre-fetch is automatic upon trigger, while a specific state controller 1804 and RAM memory bank 1803 are occupied with the background transfer, the other state controllers 1804 and RAM memory banks 1803 are free to perform operations independent of this background operation.

A further aspect of the invention is the use of the state controllers 1804 to apply potentials via paths 1820 to access flow regulator 1801 indicating whether the RAM memory banks 1803 associated with each state controller 1804 is currently busy on an existing read or write operation, or is available to received requests for a new read or write operation. Since the memory elements of the RAM memory bank devices 1803 operate at the high data rate of an optical bus, a RAM memory bank 1803 can execute read or write operation is at the speeds appropriate to optical fiber buses. As a consequence, a busy signal is applied by the state controller via path 1820 to access flow regulator 1801 indicating the availability or lack thereof, of its associated RAM memory bank. This signal persists only for the few nanoseconds required by the RAM memory bank 1803 device to execute the read or write operation. Thus, the application of these busy/idle potentials to paths 1820 by the state controllers 1804 comprises a contention facility which enables access flow regulator 1801 and its element 1821 to monitor the busy/idle state of the RAM memory banks 1803. This eliminates any contention delay due to the prior art complex logic circuit elements or a contention arrangement which imposes an arbitrary predetermined minimum time interval between read or writes to a RAM memory bank 1803. By this means, the access flow regulator 1801, paths 1820 and the state controllers 1804 provide an efficient and high speed contention facility that operates at the nanosecond rates of optical buses. This improved high speed contention arrangement permits a greater throughput of data served by system 1811 since its incoming and outgoing queues associated with ports 1817 and 1818 can exchange and process data at a more rapid rate since they are served by the high speed elements of RAM memory bank 1803. Thus, the linked list engine 1800 of FIG. 18 can execute the reading and writing of the data queues required by ports 1817 and 1818 at the speeds commensurate of optical fiber links.

Figure 19:
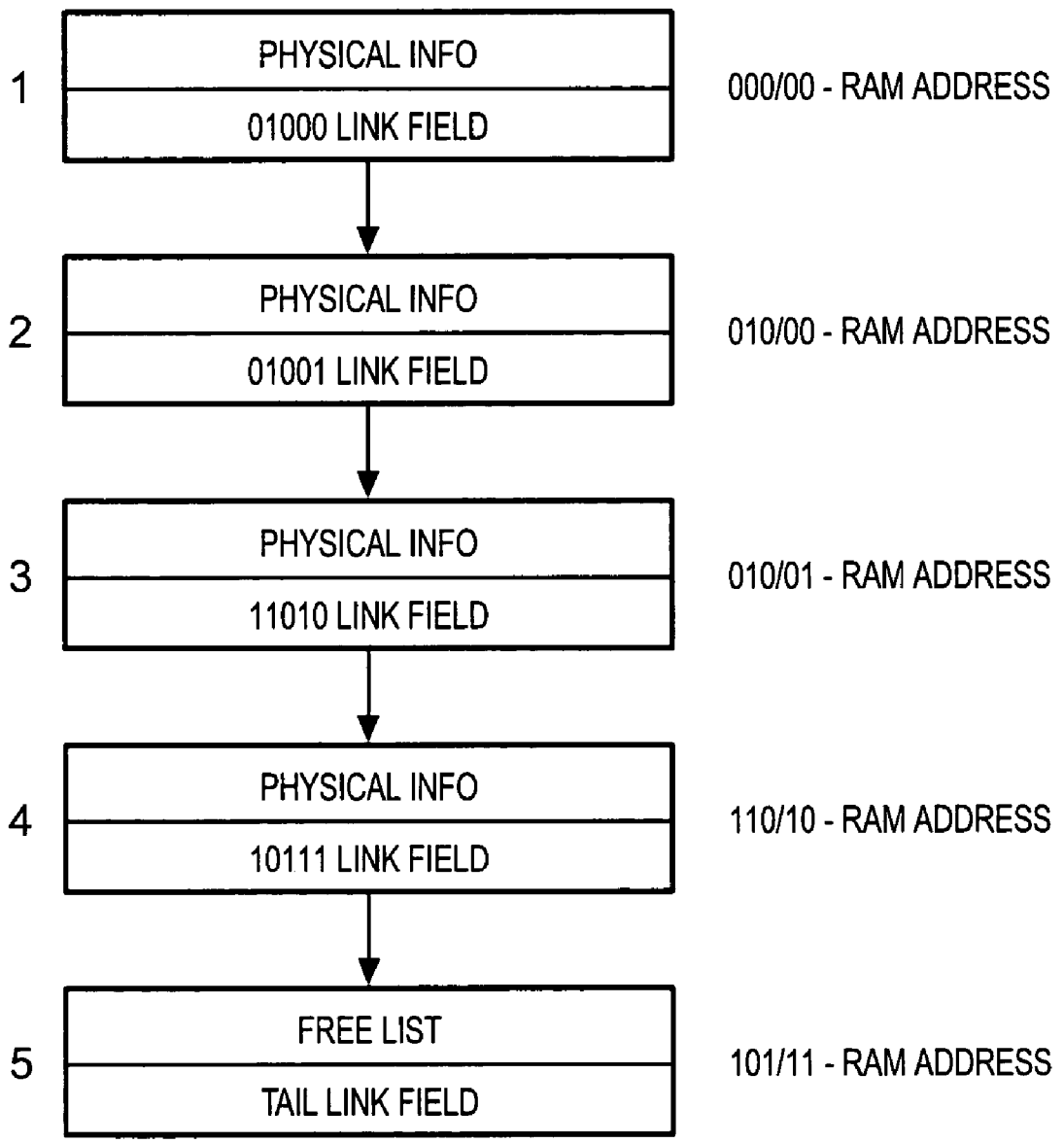
FIG. 19 discloses an arrangement of linked list buffers in accordance with the present invention.

Description of FIG. 19

FIG. 19 discloses a typical linked list comprising five buffers 1 through 5. The five buffers linked list is not stored on the same RAM bank 1803 of FIG. 18. Instead, the five buffers are stored randomly on five separate banks 1803. Each buffer has a first part that contains the physical information or data to be stored and processed by the system. The lower portion of each buffer contains a link field address to the RAM bank that stores the next buffer of the linked list. Buffer 1 on FIG. 19 stores physical information in its upper portion and stores the link field address of 0100 in its lower portion. The address of RAM bank that stores buffer 1 is 000/00 as shown to the right of the buffer 1.

Buffer 2 of the linked list is stored in RAM address 010/00 as specified in the link field of buffer 1. The top portion of buffer 2 contains physical information (data). The lower portion contains the link field address of 01001 specifying the RAM bank identity and location that stores buffer 3 of the linked list.

Buffer 3 is stored in RAM bank address 010/01 as specified by the link field of buffer 2. The link field of buffer 3 contains the address of 11010 specifying the location of the fourth buffer of the linked list.

The fourth buffer is stored in RAM address 110/10 as specified by the link field of buffer 3. Similarly, the fifth and last buffer of the linked list is stored in RAM address 101/11 as specified by the link field of buffer 4. The top portion of buffer 5 indicates that it is the head buffer of the free list available for use.

The buffers on a linked list are stored randomly on separate RAM banks of FIG. 18. This randomness is desirable and necessary for the efficient data processing and control operations of the system. This randomness is particularly required and useful to achieve the desired operation of the contention facilities of the invention.

Figure 20:
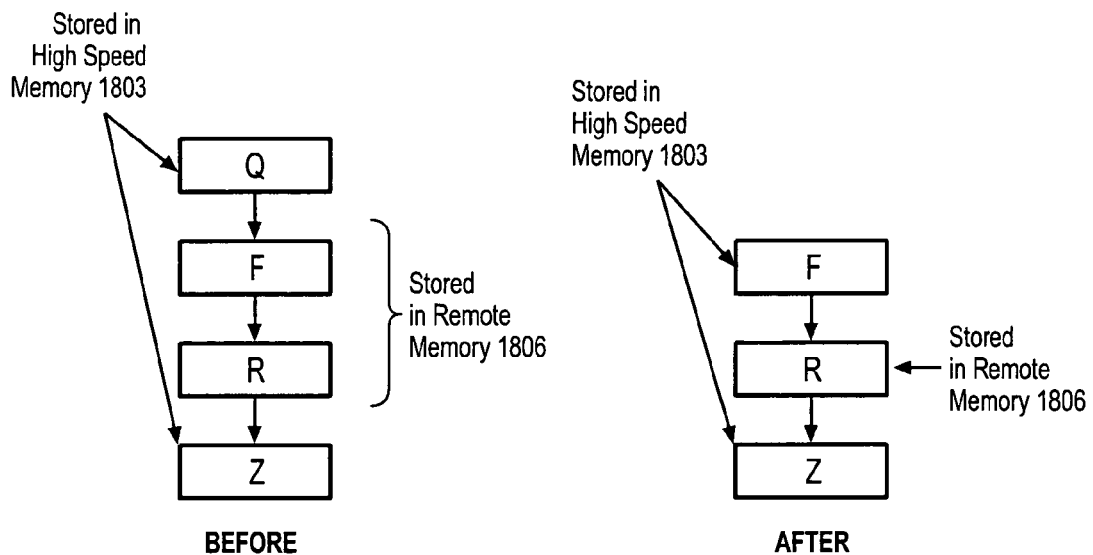
FIG. 20 discloses a read operation illustrating the creation of a buffer as the new head of a linked list.
Figure 21:
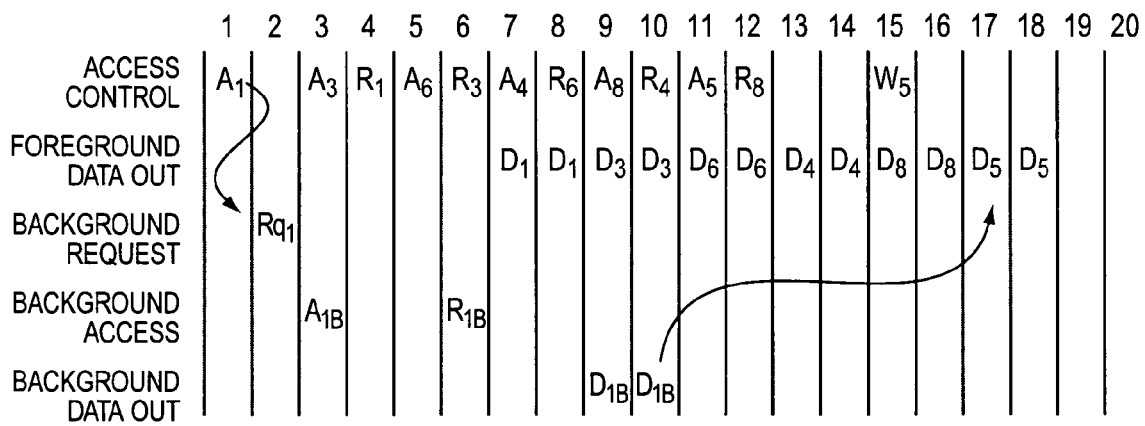
FIG. 21 is a timing diagram illustrating an operation for the system of FIG. 18.

Description of FIGS. 20 and 21

FIG. 20 shows how the head of a linked list queue in a RAM memory bank 1803 can become exhausted, and require bulk RAM memory 1806 access. The linked list queue shown has, in their respective order, buffers with content Q, F, R, and Z. In FIG. 21, the first access of clock period A1 reads from the RAM 1803 address holding content Q in clock periods 7 and 8 of FIG. 21. But, access A1 retrieves the head of the queue for use from high speed memory 1803 and store the next element F in remote RAM 1806. So, access A1 triggers background request Rq1 in clock period 2 through the state controller 1804 of the RAM bank 1803 involved with access A1. This remote memory 1806 access request is processed by the background access multiplexer 1808 then returned by remote memory access A1B in clock period 3 of FIG. 21. Note that remote RAM 1806 accesses happen concurrently with the flow of accesses to RAM bank 1803. Data D1B is exhumed from the remote RAM 1806 during clock periods 9 and 10. This data is the linked list element F. The element F is written into an empty element taken from the free list whose address is in RAM bank 5 with an access A5 starting on clock cycle 11. Linkages are preserved throughout. Thus, the head of the queue, having element F, again resides in high-performance RAM bank 1803–1805. RAM bank 1803–1805 holding element Q and the remote memory element formerly holding content F are returned to their respective free lists.

The uncorrelated nature of the accesses to high-performance RAM 1803 is preserved, keeping the model leading to Table 2 intact, as well as sustaining the prospect for more efficient utilization, as demonstrated in FIG. 20 by the lack of gapping in access control. Recall from earlier discussions that gaps are caused by contention. Correlated traffic, that is sequential accesses to the same bank, causes contention.

Figure 22:
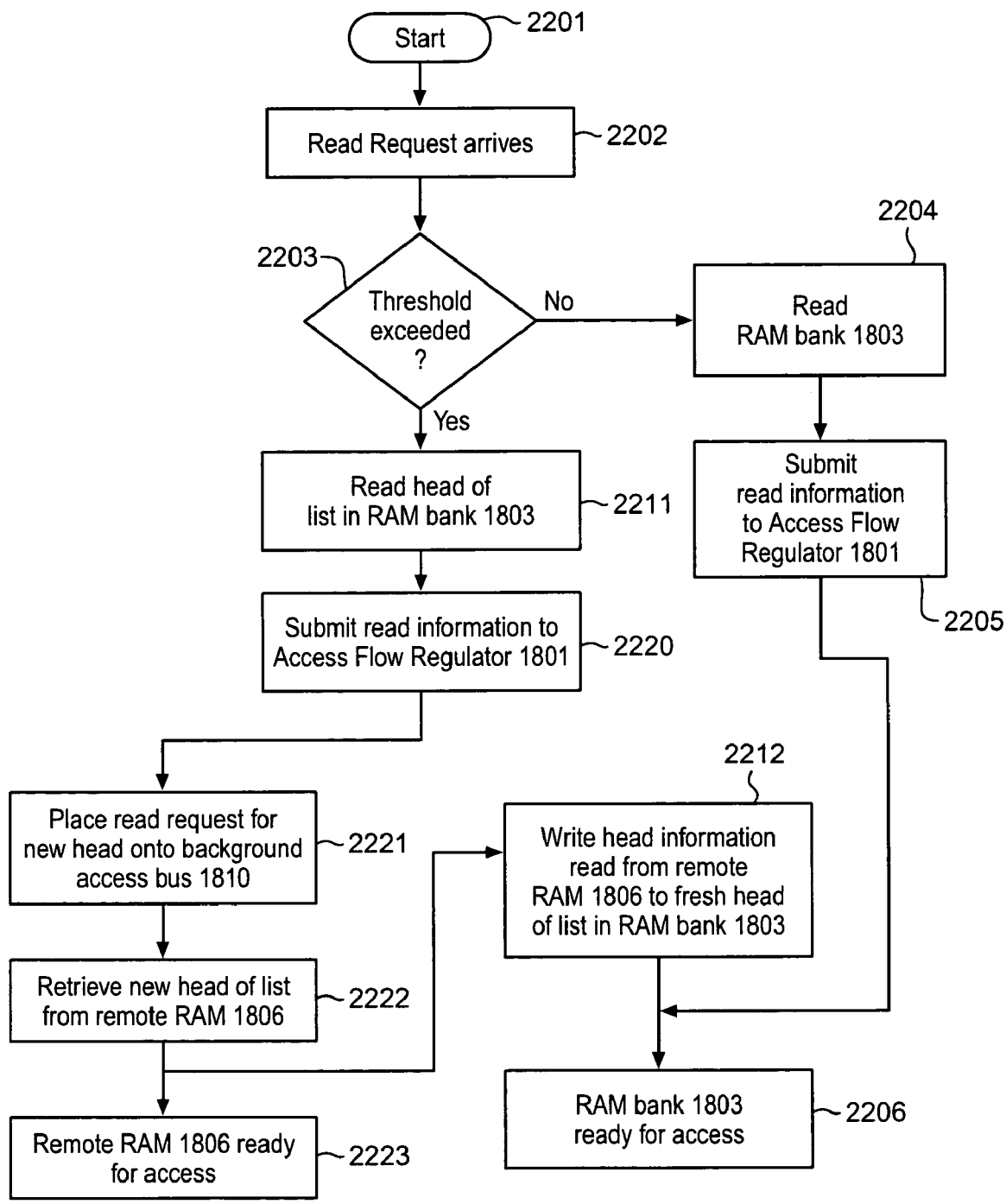
FIGS. 22–25 are flow charts illustrating the operation of the present invention.

Description of FIG. 22

FIG. 22 discloses the process of the present invention which executes read requests initiated by access flow regulator 1801 requesting the reading of a linked list whose buffers are stored randomly in the various RAM banks 1803-1 through 1803-8 of the FIG. 18 (hereinafter RAM banks 1803). The process starts in step 2201 when access flow regulator 1801 receives instructions from processor 1814 requesting a read operation. The individual buffers of the linked list are read sequentially one at a time and are stored randomly in the various ones of RAM banks 1803. The reading of each buffer requires a separate read request by access flow regulator 1801.

The first read request is received by step 2202 and extended to step 2203 which determines whether a threshold is exceeded regarding the number of elements to be read from RAM bank 1803. As previously described, the reading of a linked list requires the reading of the initial buffer (the head) of the list from the RAM bank 1803 in which the head buffer is stored. The remainder of the execution of the linked list requires that the reading intermediate buffers of the linked list, which are stored in remote RAM 1806 and which must be retrieved and entered into RAM banks 1803. The efficient transfer of buffers from remote RAM 1806 back to the RAM banks 1803 requires that a plurality of such requests be applied to background access multiplexer 1808 and, in turn, to remote RAM 1806 for efficiency in the execution of the step. It is for this reason that the threshold detection element 2203 is provided so that a plurality of such requests are extended to remote RAM 1806 at the same time rather than one at a time individually.

Let it initially be assumed that element 2203 determines that the threshold is not exceeded. In this case, remote RAM 1806 is not immediately accessed and the process proceeds to step 2204 which reads the RAM bank identified by the read request for the first buffer (head) of the linked list. This buffer location is read, temporarily stored and the process proceeds to step 2205 which returns the read information to access flow regulator 1801. The process then extends to step 2206 indicating that the RAM banks 1803 are ready for receipt of the next access request from access flow regulator 1801. A tail buffer is read in the same manner if the linked list is comprised of only one buffer.

Let it next be assumed that element 2203 determines that the newly-arrived read request of step 2202 causes the threshold to be exceeded regarding the number buffers available in RAM bank 1803 for a read operation. In this case, step 2211 reads the head buffer and continues to step 2220 which transmits the read information of step 2211 to access flow regulator 1801. Next, step 2221 requests a read of the intermediate buffers near the head of the list in RAM 1806 to be read. This includes a request for the head of the list. In so doing step 2221 places a read request for a new head buffer of the list onto the background access bus 1810 serving the specified RAM bank 1806. Next, step 2222 retrieves the plurality of intermediate buffers of the list from remote RAM 1806. The process then proceeds to step 2223 which indicates that the remote RAM 1806 is ready for another access. The process also proceeds to step 2212 which writes into RAM bank 1803 the information read out of the remote RAM 1806 during step 2222 written into a specified RAM bank 1803. The information includes the formation of a new head buffer of the list in the specified RAM bank 1803. The process then proceeds to step 2205 which extends the information to access flow regulator 1801. The process then extends to step 2206 which represents the completion of the read request and indicates that the RAM banks 1803 are ready for the next access request.

Figure 23:
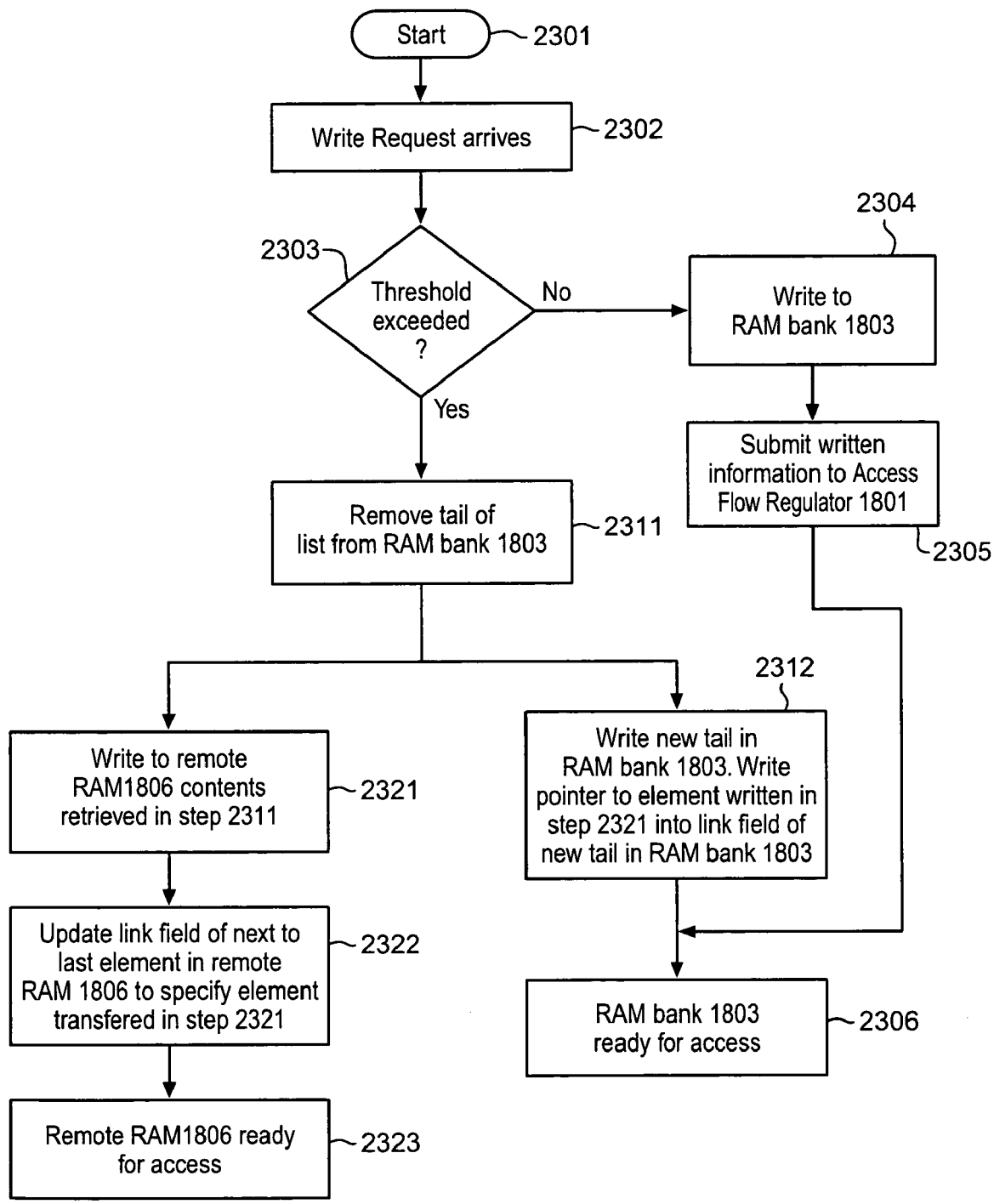

Description of FIG. 23

FIG. 23 discloses the steps required to execute a write request received from access flow regulator 1801. The process begins with step 2301 in which access flow regulator 1801 applies the write request to bus 1802. Step 2302 enters the write request into the state controllers 1804 of FIG. 18. Step 2203 determines whether the threshold is exceeded for written elements near the tail of the list. If the threshold is not exceeded, (which would be the case for a new list), the last buffer (the tail) of the list is written into a RAM bank 1803. The process then proceeds to step 2305 which indicates to access flow regulator 1801 that an access request to remote RAM 1806 is not necessary. The process then proceeds to step 2306 which indicates that the RAM bank 1803 is ready for the next access.

Let it be assumed that step 2303 determines that the threshold for the write request is exceeded. In this case, the process proceeds to step 2311 which retrieves any tail of the list held in RAM bank 1803. The process then proceeds to step 2321 which places the tail buffer retrieved in step 2311 onto background access bus 1810 for deposit to remote RAM 1806. Next, step 2322 updates the link field from the next-to-last last buffer in remote RAM 1806 to the location of the buffer written in step 2321, since the buffer indicated in the link field of the next-to-last buffer has, by steps 2311 and 2321, changed location from RAM bank 1803 to remote RAM 1806. Step 2323 indicates that the remote RAM 1803 just written is ready for access.

Concurrent with step 2321, in step 2312, an empty buffer is written to the end of the linked list into RAM bank 1803. The pointer to the buffer written in step 2321 is written into the link field of the empty buffer written in step 2312. The process then extends to step 2306 which represents the completion of the write request and indicates that the RAM banks 1803 are ready for the next access request.

Figure 24:
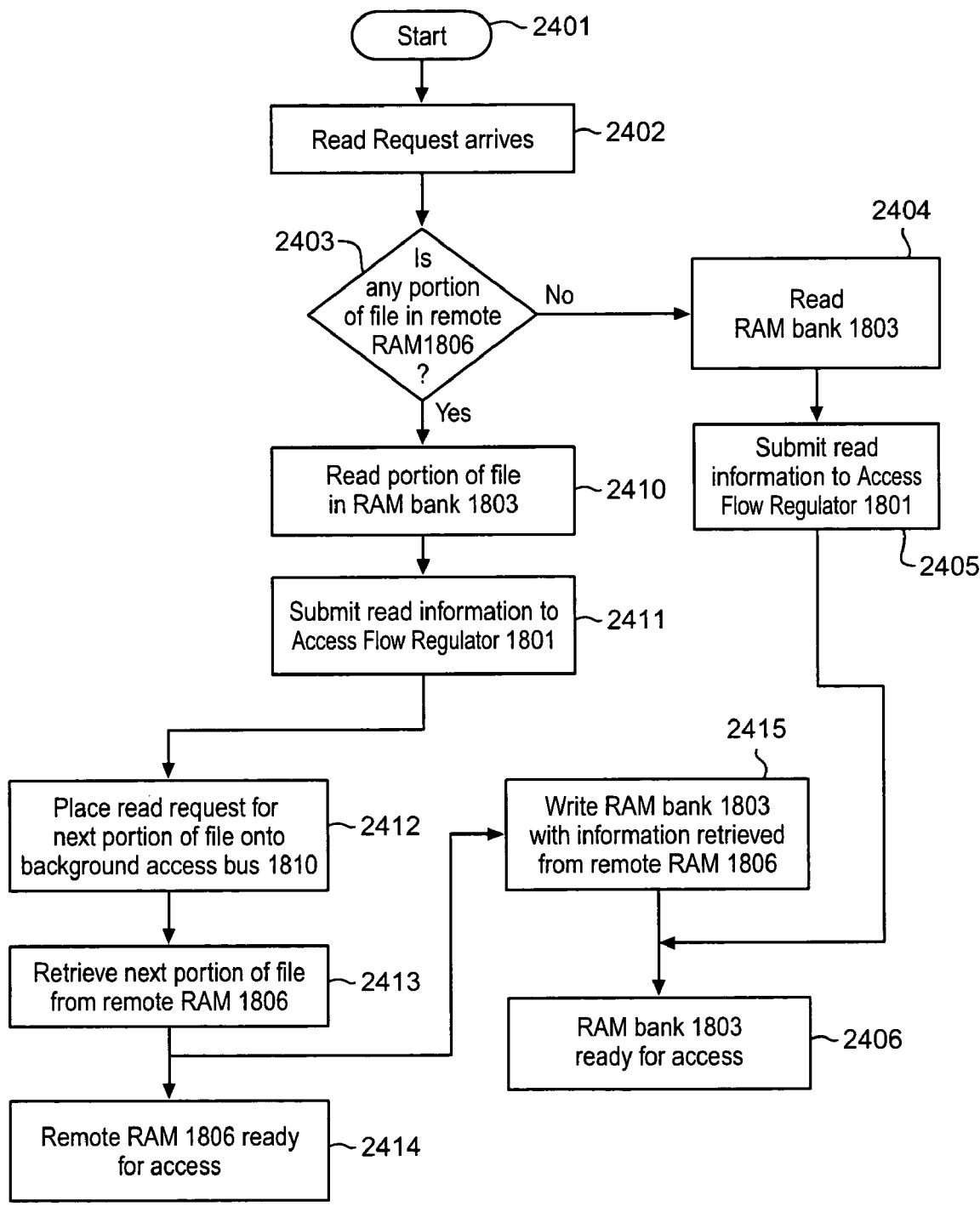

Description of FIG. 24

Memory management facilities have been described for processing linked list files. It accordance with another possible exemplary embodiment of the invention, the disclosed memory management facilities may also use high speed RAM bank memories 1803 and remote memory 1806 to process data files that are not of the linked list type. This is described for the process steps of FIGS. 24 and 25.

The following describes the process steps of FIG. 24 in which a read operation of FIG. 18 is described with RAM banks 1803 and remote RAM 1806 configured to operate in such a manner that the high speed low capacity RAM banks 1803 store information received from access flow regulator 1801. Remote RAM 1806 is used as an overflow for storing information for large files. The process begins in step 2401 and proceeds to step 2402 in which access flow regulator 1801 transmits a read request to bus 1802 requesting that information stored in a RAM bank 1803.

Step 2403 determines whether the size of the file to be retrieved exceeds to the present storage capacity of RAM 1803. If the threshold has not been exceeded, the process proceeds to step 2404 in which the RAM bank 1803 reads the requested file for transmission back to access flow regulator 1801. The process then steps to step 2405 which returns the requested information read from RAM bank 1803 via state controller 1804 and over bus 1802 back to access flow regulator 1801. The access flow regulator 1801 receives the information and passes it to processor 1814 for use in controller the function associated with the requested information. The process then continues to step 2406 which advises access flow regulator 1801 that the RAM bank 1803 is ready for the receipt of another access request.

If element 2403 determined that the size of the requested file to be read exceeds the threshold, the process moves to step 2410 which reads the portion of the file that may be in RAM bank 1803. The process continues to step 2411 where the read information is returned to access flow regulator 1801. The process proceeds to step 2412 which places a read request from remote RAM 1806 onto the background access bus 1810 which extends the request through background access multiplexer 1808 to the requested remote RAM 1806.

The process then moves to step 2413 which retrieves the requested information from the remote RAM 1806. Next, step 2415 transmits the information retrieved in step 2413 from remote RAM 1806 to the RAM bank 1803 which stores it. The process then proceeds to steps 2414 and 2406 both of which indicate to access flow regulator 1801 that the RAM banks 1803 are ready for the receipt of another access request.

Figure 25:
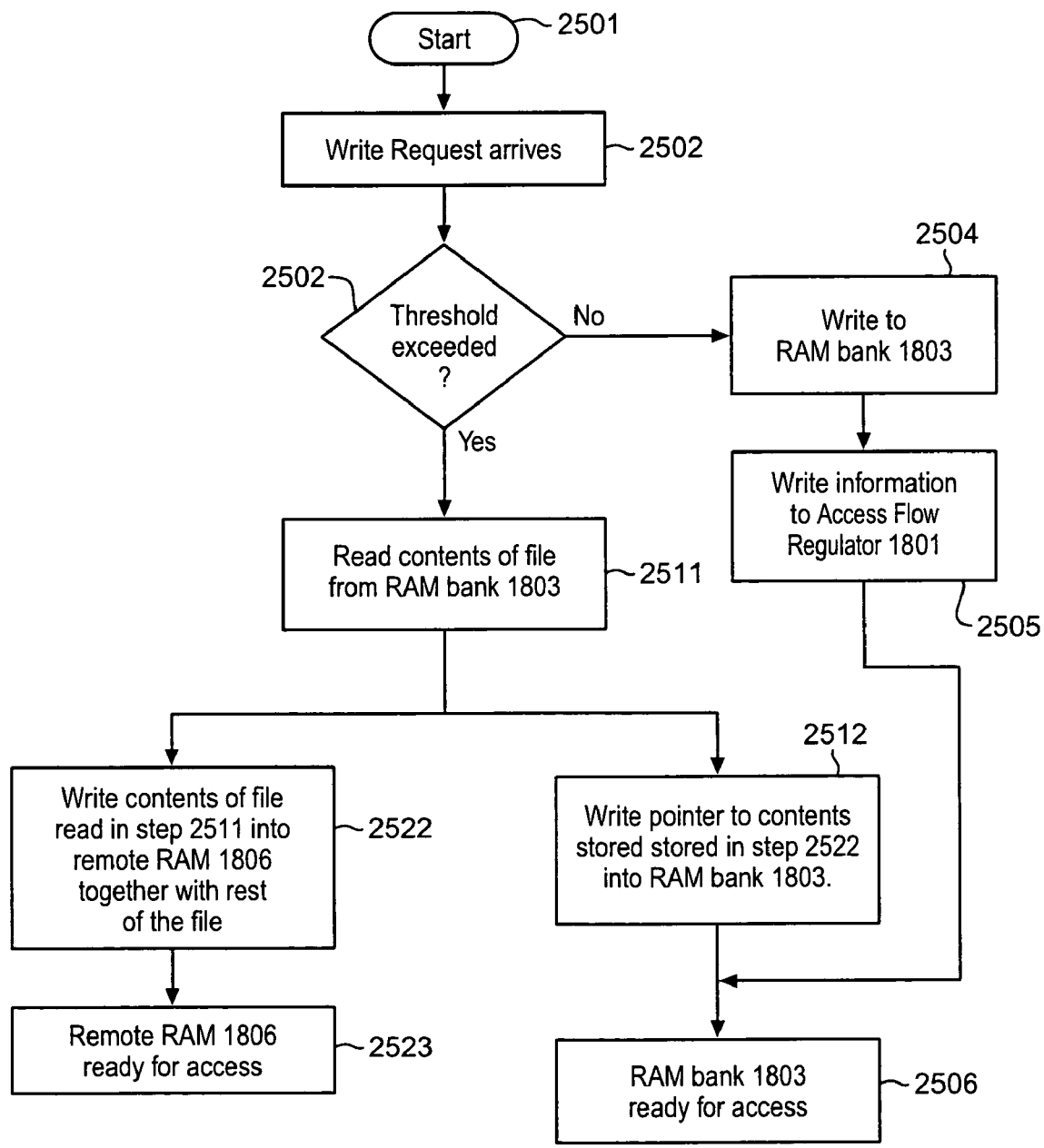

Description of FIG. 25

FIG. 25 describes write request for the addition to a file already existing in RAM banks 1803. RAM bank 1803 and remote RAM 1806 cooperate to store bulk data received from access control regulator 1801 in a manner similar to that described for the read operation of FIG. 24. RAM bank 1803 stores an existing selected amount of data for a file with the remainder of large volume files being overflowed and written into remote RAM 1806.

The process begins in step 2501 and proceeds to element 2502 which analyzes the write request received from access control regulator 1801 and determines whether the size of the requested file to be written exceeds the capacity of that which could be stored in RAM bank 1803. If the threshold is not exceeded, element 2502 causes step 2504 to write additional data to the related file already in selected RAM bank 1803. The process then steps to element 2505 which sends an acknowledgement back to access control regulator 1801 that the requested file has been written in RAM bank 1803, and that a write to remote RAM 1803 is unnecessary.

If element 2502 determines that the threshold is exceeded, the process proceeds to step 2511 which causes the already stored part of the file stored in RAM bank 1803 to be read. The process then steps to step 2522 which initiates the operations required to cause this part of the file retrieved in step 2511 to be written in a remote RAM bank 1806. Step 2523 indicates that remote RAM 1806 is again ready for access. Step 2512 causes a write pointer to be written in RAM bank 1803 to enable it to associate the remote RAM 1806 address containing the remainder of the file whose other portion is written into RAM 1803. The process then proceeds to step 2506 in which indicates that the RAM bank 1803 is ready for the receipt of another access request.

Epilogue

Network traffic shaping requires flexible buffering. Higher-priority flows take precedence over other lower-priority flows. For example, the demands of real-time traffic are greater than that of ordinary data traffic, such as file transfer. But, the instantaneous characteristics of traffic are random. The next inbound packet could be routed to any flow. For example, consider again FIG. 3. A stream of packets inbound to Node A on Link 1 might be outbound to either Link 2 or Link 3. The traffic inbound on Link 1 might carry thousands of consecutive packets directed towards Link 2, then carry a single packet directed for Link 3, followed by thousands of consecutive packets again directed towards Link 2. In addition to the requirement that it not drop a packet and that it support recovery from catastrophic events, such as a cable cut, it must support variable-delay scheduled outbound traffic shaping algorithms. Thus, the nature of the traffic both incoming and outgoing is complicated and requires flexible buffering.

The most efficient arrangement for balancing buffer treatment for inbound streams and outbound streams is the hardware linked list engine. But, current implementations of the hardware linked list engine are either big and slow, or small and fast. The improved linked list engine of the present invention is superior to the prior list engines because it offers inexpensive gigabytes of buffer storage and it operates at the maximum throughput of the available semiconductor memory. Thus, the improved linked list engine of the present invention is as big as the current state of the art and is substantially faster. The additional speed is attractive to traffic shaping applications because the improved linked list engine supports higher capacity (i.e., OC-768) fiber lines, given the same amount of hardware resources, namely FPGA's and SDRAM. The improved linked list engine is enabled to support the higher capacity lines because its buffers are up to gigabytes in depth.

This invention supports burst mode of commercially available dynamic memories. This support is manifest in two facets of this invention. First, when accesses to commercially available dynamic RAM are continuous and consecutive, this invention occupies the data pins of the commercially available dynamic memory, either reading the retrieved information or writing information to be stored, while initiating the next consecutive access. Second, this invention caches buffers to be written to commercially available dynamic RAM and buffers read from commercially available dynamic RAM on a context-by-context basis.

By concurrently processing the data pins for the current access requests and initiating the next access request, this invention utilizes the data bus latching feature of the data bus on the commercially available dynamic RAM. This feature allows a whole row of the dynamic memory to be read out or written in at the speed of the data bus, typically 166 megahertz or more. This row may be 128 bits in length, but the number of data bus pins available on the dynamic memory may only be eight. So, the memories internally latch the row of the memory to be read and deliver this information eight bits at a time to the pins, or latch the inbound data eight bits at a time before writing the entire row to its internal memory array. By overlapping accesses in this way, this invention sustains data on the data bus in such a way that continuous reads from the commercially available dynamic memories proceed at a rate compatible with the RAM banks of the invention, such as RAM bank 1803 of FIG. 18. This is valuable when a list many buffers long is accessed consecutively. In such a case, information must be streamed out of the commercially available dynamic memory. In order to sustain performance during such an extended series of accesses to the commercially available dynamic memory, the steady-state performance of the interface to the commercially available dynamic memory must be consistent with any other memory.

Caching the buffers to be written and the buffers that have been read permits the commercially available dynamic memories to be used efficiently. It's most efficient to access a commercially available dynamic memory by the row. But, rows are typically large, on the order of 128 bits or more. An individual buffer to be stored or retrieved may only consist of 16 bits. So, if buffers are cached until enough information is collected to make up a full row, then a write access to the commercially available dynamic memory might transfer a full row, which is most efficient. Similarly, if the full row is cached upon read, only one access per row needs be made of the commercially available, which is most efficient.

Thus, caching writes and reads results in substantial performance increases, since fewer accesses are required of the commercially available dynamic memory and lessening the number of accesses lowers contention for the commercially available dynamic memory.

This invention supports many concurrent linked lists. Each interaction to an arbitrary linked list of the many concurrent linked lists is completely independent of the rest of the many concurrent linked lists.

The following claims characterize RAM banks 1803 as high speed memories and remote memory 1806 as bulk memory.

The above description discloses possible exemplary embodiments of this invention. It is expected that those skilled in the art can and will design alternative embodiments that infringe on this invention as set forth in the following claims either literally or through the Doctrine of Equivalents.

I claim:

1. A method of operating a memory management system to resolve contention for access to a data bus extending to a plurality of memories; said method comprising the steps of:
    generating requests for a reading and writing of data in said memories;
    generating signals indicating a busy/idle state of each of said memories;
    extending said signals from said memories to an access flow regulator over a request bus comprising separate conductors independent of said data bus with each conductor being individual to a different one of said memories;
    operating said access flow regulator in response to a receipt of said signals to determine a busy/idle state of each of said memories;
    applying said requests to said access flow regulator; and
    operating said access flow regulator in response to a determination that one of said memories is currently idle for granting a request for access to said data bus for a reading or writing of data in said one memory.

2. The method of claim 1 including the further steps of:
    operating said access flow regulator in response to a determination that none of said memories is currently idle for buffering said request until one of said memories becomes idle; and
    serving said buffered request when said one of said memories becomes idle.

3. The method of claim 1 including the further steps of:
    determining that a plurality of requests are concurrently seeking access to an idle one of said memories;
    granting one of said requests access to said idle memory; and
    buffering others of said requests until one of said memories becomes idle and available to serve said other request.

4. The method of claim 1 wherein the step of generating signals includes the steps of:
    monitoring a present busy/idle state of each of said memories;
    generating a busy signal for a memory only when the memory is in a busy state;
    generating an idle signal for a memory immediately upon a determination that the memory has assumed an idle state;
    extending said idle signal over said request bus to said access flow regulator; and
    operating said access flow regulator to grant a waiting request access to said memory immediately upon the receipt of said idle signal by said access flow regulator.

5. The method of claim 1 wherein said system further comprises a plurality of state controllers each of which is individual to a different one of said memories, said request bus connects said access flow regulator with said memories via said state controllers; said method includes the steps of:
    operating said access flow regulator to select an idle one of said memories that is to receive a request;
    transmitting said request from said access flow regulator over said request bus to the state controller individual to said idle one of said memories;
    extending said request from said state controller to said idle memory individual to said state controller; and
    operating said state controller to control the operation of the memory unique to said state controller.

6. The method of claim 5 wherein said step of operating said state controller includes the steps of
    determining a present occupancy level of a selected memory;
    transmitting said request to said selected memory if said present occupancy level is not exceeded; and
    buffering said request in said access flow regulator if said occupancy level of said selected memory is exceeded.

7. The method of claim 1 including the further steps of:
embodying said system into a network node having incoming and outgoing links;
applying requests received by said links to said access flow regulator; and
processing said requests for granting access to said memories via said data bus to control the data throughput of said network node.

8. The method of claim 1 including the further steps of:
operating said system to concurrently process a plurality of requests for access via said data bus to idle ones of said memories; and
buffering said requests that are received when an idle one of said memories is not available.

9. The method of claim 5 wherein said step of extending said signals to said access flow regulator includes the steps of:
extending said signals from said memories over separate conductors of said request bus via said state controllers to said access flow regulator with each of said conductors being individual to a different one of said memories; and
operating said access flow regulator to detect the signal on each conductor to determine a busy/idle state of the memory unique to each said conductor.

10. The method of claim 9 including the further steps of:
extending said signals over said separate conductors of said request bus from said state controllers to said access flow regulator, each conductor of said request bus extends between said access flow regulator and a different one of said state controllers.

11. A memory management system adapted to resolve contention for access to a data bus extending to a plurality of memories; said system comprising:
apparatus for generating requests for access to said data bus for a reading and writing of data in said memories;
apparatus for generating signals indicating a present busy/idle state of each of said memories;
apparatus independent of said data bus for extending said signals from said memories to an access flow regulator over a request bus comprising separate conductors with each conductor being individual to a different one of said memories;
apparatus for operating said access flow regulator in response to a receipt of said signals to determine a present busy/idle state of each of said memories;
apparatus for applying said requests to said access flow regulator; and
apparatus for operating said access flow regulator in response to a determination that one of said memories is currently idle for granting a request for access to said data bus for the reading or writing of data in said one memory.

12. The system of claim 11 further including:
apparatus for operating said access flow regulator in response to a determination that none of said memories is currently idle for buffering a request until one of said memories becomes idle; and
apparatus for granting said buffered request when said one of said memories becomes idle.

13. The system of claim 11 further including:
apparatus for determining that a plurality of requests are concurrently seeking access to an idle one of said memories;
apparatus for granting one of said requests access to said one idle memory; and
buffering others of said requests until one of said memories becomes available to serve said other request.

14. The system of claim 11 further including:
apparatus for monitoring a present busy/idle state of each of said memories;
apparatus for generating a busy signal only when the memory is in a busy state;
apparatus for generating an idle signal immediately upon a determination that a memory has assumed and idle state;
apparatus for extending said idle signal over said request bus to said access flow regulator; and
apparatus for operating said access flow regulator to grant a waiting request access via said data bus to said memory immediately upon the receipt of said idle signal by said access flow regulator.

15. The system of claim 11 further comprising:
a plurality of state controllers each of which is individual to a different one of said memories;
said request bus connects said access flow regulator with said memories via said state controllers;
apparatus for operating said access flow regulator to select an idle one of said memories that is to receive a request;
apparatus for transmitting said received request from said access flow regulator over said request bus to the state controller individual to said idle one of said memories; and
apparatus for extending said received request from said state controller to said idle ones of said memories.

16. The system of claim 15 wherein said apparatus for operating said state controller includes:
apparatus for determining a present occupancy level of a selected memory;
apparatus for transmitting said received request to said selected memory if said present occupancy level is not exceeded; and
apparatus for buffering said received request in said access flow regulator if said occupancy level of said selected memory is exceeded.

17. The system of claim 15 further including:
apparatus for embodying said system into a network node having incoming and outgoing links;
apparatus for applying requests received by said links to said access flow regulator; and
apparatus for processing said request for granting access via said data bus to said memories to control the data throughput of said network node.

18. The system of claim 11 further including:
apparatus for operating said system to concurrently process a plurality of requests for access via said data bus to idle ones of said memories; and
apparatus for buffering said requests that are received when an idle one of said memories is not available.

19. The method of claim 13 wherein said apparatus for extending said signals comprises:
apparatus for extending said signals from said memories over separate conductors of said request bus via said state controllers to said access flow regulator with each of said conductors being individual to a different one of said memories; and
apparatus for operating said access flow regulator to detect the signal on each said conductor of said request bus to determine a busy/idle state of the memory unique to each said conductor.

20. The method of claim 19 further includes:
said apparatus for extending said received signals over said separate conductors of said request bus from said state controller to said access flow regulator, wherein each said conductor extends between said access flow regulator and a unique one of said state controllers.

* * * * *